US012272473B2

(12) United States Patent
Nomura et al.

(10) Patent No.: US 12,272,473 B2
(45) Date of Patent: Apr. 8, 2025

(54) ANISOTROPIC RARE EARTH SINTERED MAGNET AND METHOD FOR PRODUCING THE SAME

(71) Applicant: SHIN-ETSU CHEMICAL CO., LTD., Tokyo (JP)

(72) Inventors: Tadao Nomura, Fukui (JP); Masayuki Kamata, Tsuruga (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/050,748

(22) Filed: Oct. 28, 2022

(65) Prior Publication Data

US 2023/0148121 A1 May 11, 2023

(30) Foreign Application Priority Data

Nov. 5, 2021 (JP) ................................ 2021-181252
Sep. 6, 2022 (JP) ................................ 2022-141632

(51) Int. Cl.
*H01F 1/057* (2006.01)
*B22F 3/24* (2006.01)
*H01F 41/02* (2006.01)

(52) U.S. Cl.
CPC ................................. *H01F 1/0577* (2013.01)

(58) Field of Classification Search
None
See application file for complete search history.

(56) References Cited

U.S. PATENT DOCUMENTS

2015/0294770 A1* 10/2015 Tanaka .................... H02K 1/02 420/416
2018/0182515 A1 6/2018 Ito et al.

FOREIGN PATENT DOCUMENTS

| | | | |
|---|---|---|---|
| JP | 2014-216339 | A | 11/2014 |
| JP | 2016-111136 | A | 6/2016 |
| JP | 2018-174323 | A | 11/2018 |
| JP | 2019-179796 | A | 10/2019 |
| JP | 2020-95989 | A | 6/2020 |
| JP | 2021-44361 | A | 3/2021 |

* cited by examiner

*Primary Examiner* — Xiaowei Su
(74) *Attorney, Agent, or Firm* — Oblon, McClelland, Maier & Neustadt, L.L.P.

(57) ABSTRACT

The invention provides an anisotropic rare earth sintered magnet having an $Nd_2Fe_{14}B$-type compound crystal as a main phase and containing Ce, and exhibiting good magnetic characteristics, and a method for producing the same. The anisotropic rare earth sintered magnet has a composition of a formula $R_x(Fe_{1-a}Co_a)_{100-x-y-z}B_yM_z$ (where R is two or more kinds of elements selected from rare earth elements and indispensably including Nd and Ce), in which the main phase is formed of an $Nd_2Fe_{14}B$-type compound crystal, main phase grains such that the Ce/R' ratio in the center part of the grains (where R' is one or more kinds of elements selected from rare earth elements and indispensably including Nd) is lower than the Ce/R' ratio in the outer shell part thereof exist, and a Ce-containing R'-rich phase and a Ce-containing R'(Fe,Co)$_2$ phase exist in the grain boundary part. The production method is for producing the anisotropic rare earth sintered magnet.

18 Claims, 3 Drawing Sheets

ANISOTROPIC RARE EARTH SINTERED MAGNET AND METHOD FOR PRODUCING THE SAME

FIELD OF THE INVENTION

The present invention relates to an anisotropic rare earth sintered magnet having an $Nd_2Fe_{14}B$-type crystal compound as a main phase and containing Ce, and a method for producing the same.

BACKGROUND OF THE INVENTION

An Nd—Fe—B sintered magnet is expected to have an increasing demand in the future with the background of electrification of automobiles, and enhancement of performance and power saving of industrial motors, and is expected to further increase in production volume. However, rare earth elements such as Nd, Pr, Dy and Tb used as raw materials are expensive and there is a concern that supply and demand balance of rare earth materials will be lost in the future. Accordingly, studies have been conducted to replace a part of Nd with Ce that has a higher element content in the crust and is inexpensive.

For example, PTL 1 shows a rare earth magnet excellent in both coercive force and residual magnetization, which is provided with a main phase and a grain boundary phase and is such that the entire composition is represented by $(R^2_{(1-x)}R^1_x)_yFe_{(100-y-w-z-v)}Co_wB_zM^1_v\cdot(R^3_{(1-p)}M^2_p)_q$ (wherein $R^1$ is an element selected from Ce, La, Y, and Sc, $R^2$ and $R^3$ each are an element selected from Nd, Pr, Gd, Tb, Dy, and Ho, $M^1$ is a predetermined element or the like, $M^2$ is a transition metal element or the like that alloys with Re), the main phase has an $R_2Fe_{14}B$-type crystal structure, the average particle size of the main phase is 1 to 20 μm, the main phase has a core part and a shell part, the thickness of the shell part is 25 to 150 nm, and when the light rare earth element ratio in the core part is a and the light rare earth element ratio in the shell part is b, they satisfy $0 \le b \le 0.30$ and $0 \le b/a \le 0.50$, and a production method for the magnet.

PTL 2 shows a rare earth magnet provided with main phase grains containing R, T and B and a grain boundary phase, wherein R contains Nd and Ce, T contains Fe, the grain boundary phase contains an R-T phase and an R-rich phase, the R-T phase contains an intermetallic compound of R and T, the content of R in the R-rich phase is larger than the content of R in the R-T phase, Ce/R×100 is 65 to 100 in the R-T phase, and the content of R in the R-rich phase is 70 to 100 atomic %.

PTL 3 shows a rare earth magnet of which the entire composition is represented by a formula $(Nd_{(1-x-y)}Ce_xR^1_y)_p(Fe_{(1-z)}Co_z)_{(100-p-q-r-s)}B_qGa_rM_s$ (wherein $R^1$ is one or more selected from other rare earth elements than Nd and Ce, and Y, M is one or more selected from Al, Cu, Au, Ag, Zn, In, Mn, Zr, and Ti and inevitable impurity elements, and $12 \le p \le 20$, $4.0 \le q \le 6.5$, $0 \le r \le 1.0$, $0 \le s \le 0.5$, $0 \le x \le 0.35$, $0 \le y \le 0.10$, and $0.050 \le z \le 0.140$), and which is provided with a magnetic phase and a grain boundary phase existing around the magnetic phase, and a method for producing the same.

PTL 4 shows a permanent magnet having a high transverse strength, which is provided with plural main phase grains containing a rare earth element R, a transition metal element T and boron B, and a grain boundary phase existing among the plural main phase grains, wherein R contains Nd and Ce, T contains Fe, the total content of R in the permanent magnet is [R] atomic %, the total content of T in the permanent magnet is [T] atomic %, the content of B in the permanent magnet is [B] atomic %, the content of Ce in the permanent magnet is [Ce] atomic %, [Ce]/[R] is 0.1 to 0.6, [T]/[B] is 14 to 18, the grain boundary phase contains an R-T phase that contains an intermetallic compound of R and T, the area of the unit cross section of the permanent magnet is A0, the total area of R-T phase in the unit cross section is AL, and AL/A0 is 0.05 to 0.5.

PTL 5 shows a rare earth magnet provided with crystal grains wherein the crystal grains have an entire composition of $(Ce_xNd_{(1-x)})_yFe_{(100-y-w-z-v)}Co_wB_zM_v$ (wherein M is at least one of Ga, Al, Cu, Au, Ag, Zn, In, and Mn, $0 \le x \le 0.75$, $5 \le y \le 20$, $4 \le z \le 6.5$, $0 \le w \le 8$, $0 \le v \le 2$) and are composed of a core part 1 and a shell part 2 around it, and in the crystal grains, the Nd concentration in the shell part 2 is higher than in the core part 1.

PTL 6 shows an R-T-B-based sintered magnet indispensably including R1 and Ce as R therein, which can improve the adhesion strength with plating by Ce addition and which can prevent reduction in the coercive force, by long-term heat treatment of a raw material R-T-B-based magnet so as to convert the main phase grains into core/shell grains, wherein when the mass concentrations of R1 and Ce in the core part are αNd and αCe, respectively, and the mass concentrations of R1 and Ce in the shell part are βR1 and βCe, respectively, the ratio of the mass concentration ratio of R1 to Ce in the shell part (βR1/βCe=B) to the mass concentration ratio of R1 to Ce in the core part (αR1/αCe=A) (B/A) is 1.1 or more.

CITATION LIST

Patent Literature

[PTL 1] JP2021-44361 A
[PTL 2] JP2020-95989 A
[PTL 3] JP2019-179796 A
[PTL 4] JP2018-174323 A
[PTL 5] JP2016-111136 A
[PTL 6] JP2014-216339 A

As described above, it is shown that, when a Ce-containing R-T-B-based magnet is provided with main phase grains having a core/shell structure or is provided with a grain boundary phase of an R-T intermetallic compound, the magnet is given good characteristics. However, regarding the magnetic characteristics at room temperature of an $R_2Fe_{14}B$ compound of the main phase, the compound with R═Nd has a saturation magnetization $M_s$ of 1.60 T, and an anisotropic magnetic field $\mu_0HA$ of 6.7 T, while the compound with R═Ce has low data, $M_s$ of 1.17 T, and $\mu_0HA$ of 3.0 T, and accordingly, it is difficult to solve the problem that the increase in the Ce content worsens magnet characteristics.

SUMMARY OF THE INVENTION

The present invention has been made in consideration of the above-mentioned problem, and its object is to provide an anisotropic rare earth sintered magnet having an $Nd_2Fe_{14}B$-type crystal compound as a main phase and containing Ce, and exhibiting good magnetic characteristics, and a method for producing the same.

The present inventors have repeated assiduous studies for attaining the above-mentioned object and, as a result, have found that an anisotropic rare earth sintered magnet having an $Nd_2Fe_{14}B$-type crystal compound as a main phase and containing Ce, which contains, as existing therein, main phase grains such that the Ce/R' ratio in the center part of the grains (where R' is at least one element selected from rare earth elements and indispensably including Nd) is lower than the Ce/R' ratio in the outer shell part of the grains, and in which a Ce-containing R'-rich phase and a Ce-containing R'$(Fe,Co)_2$ phase exist in the grain boundary part, is given good magnetic characteristics, and have completed the present invention.

Accordingly, the present invention provides an anisotropic rare earth sintered magnet and a method for producing the same mentioned below.

(1) An anisotropic rare earth sintered magnet having a composition of a formula $R_x(Fe_{1-a}Co_a)_{100-x-y-z}B_yM_z$ (where R is two or more kinds of elements selected from rare earth elements and indispensably including Nd and Ce, M is one or more kinds of elements selected from the group consisting of Al, Si, Ti, V, Cr, Mn, Ni, Cu, Zn, Ga, Ge, Zr, Nb, Mo, Ag, In, Sn, Hf, Ta, W, Pb, and Bi, and x, y, z, and a each satisfy $12 \le x \le 17$ at %, $3.5 \le y \le 6.0$ at %, $0 \le z \le 3$ at %, and $0 \le a \le 0.1$), in which the main phase is formed of an $Nd_2Fe_{14}B$-type compound crystal, the main phase grains existing therein are such that the Ce/R' ratio in the center part of the grains (where R' is one or more kinds of elements selected from rare earth elements and indispensably including Nd) is lower than the Ce/R' ratio in the outer shell part thereof, and a Ce-containing R'-rich phase and a Ce-containing R'$(Fe,Co)_2$ phase exist in the grain boundary part.

(2) The anisotropic rare earth sintered magnet according to (1), wherein a boundary phase containing 20 at % or more R and having a thickness of 20 nm or less is formed between the main phase and the R'$(Fe,Co)_2$ phase.

(3) The anisotropic rare earth sintered magnet according to (1) or (2), wherein in the main phase grains, main phase grains not containing Ce in R' in the center part exist.

(4) The anisotropic rare earth sintered magnet according to any of (1) to (3), wherein in the main phase grains, main phase grains where R' in the center part is Nd, or Nd and Pr exist.

(5) The anisotropic rare earth sintered magnet according to any of (1) to (4), wherein the R'$(Fe,Co)_2$ phase is a phase showing ferromagneticity or ferrimagneticity at room temperature or higher.

(6) The anisotropic rare earth sintered magnet according to any of (1) to (5), wherein the Ce/R' ratio in the R'$(Fe,Co)_2$ phase is higher than the Ce/R' ratio in the outer shell part of the main phase grains.

(7) The anisotropic rare earth sintered magnet according to any of (1) to (6), wherein the Ce/R' ratio in the R'-rich phase is higher than the Ce/R' ratio in the outer shell part of the main phase grains.

(8) The anisotropic rare earth sintered magnet according to any of (1) to (7), which contains the R'-rich phase and the R'$(Fe,Co)_2$ phase in a ratio of 1 vol % or more in total.

(9) The anisotropic rare earth sintered magnet according to any of (1) to (8), wherein the Ce/R' ratio in the composition of the sintered magnet is 0.01 or more and 0.3 or less.

(10) The anisotropic rare earth sintered magnet according to any of (1) to (9), wherein the B-rich phase contained in the sintered magnet is 5 vol % or less.

(11) The anisotropic rare earth sintered magnet according to any of (1) to (10), wherein a two-interparticle grain boundary phase is formed between the adjacent main phase grains.

(12) The anisotropic rare earth sintered magnet according to (11), wherein Ce/R' in the boundary phase formed between the main phase and the R'$(Fe,Co)_2$ phase is higher than Ce/R' in the two-interparticle grain boundary phase formed between the adjacent main phase grains.

(13) The anisotropic rare earth sintered magnet according to any of (1) to (12), of which the coercive force at room temperature $H_{cJ(room\ temperature)}$ is 10 kOe or more, and a value of a temperature coefficient of the coercive force β is $\beta \ge (0.01 \times H_{cJ(room\ temperature)} - 0.720)$%/K.

(14) A method for producing an anisotropic rare earth sintered magnet of (1) to (13), including grinding an alloy that contains an $Nd_2Fe_{14}B$-type crystal compound phase and an alloy having a higher R' composition ratio and a higher Ce/R' ratio than the former, followed by mixing and powder-compression molding it in a magnetic field to give a molded product, and then sintering it at a temperature of 800° C. or higher and 1200° C. or lower.

(15) A method for producing the anisotropic rare earth sintered magnet of (1) to (14), including grinding an alloy that contains an $Nd_2Fe_{14}B$-type crystal compound phase followed by powder-compression molding it in a magnetic field to give a molded product, then sintering it at a temperature of 800° C. or higher and 1200° C. or lower, then bringing the sintered product into contact with a Ce-containing material and heat-treating it at a temperature of 600° C. or higher and a sintering temperature or lower to make Ce diffuse inside the sintered product.

(16) The method for producing an anisotropic rare earth sintered magnet according to (15), wherein the Ce-containing material to be brought into contact with the sintered product is one or more kinds selected from a Ce metal, a Ce-containing alloy and a Ce-containing compound, and the form thereof is one or more kinds selected from a powder, a thin film, a thin strip, a foil and a vapor.

(17) The method for producing an anisotropic rare earth sintered magnet according to any of (14) to (16), wherein the sintered product is heat-treated at a temperature of 300 to 800° C.

(18) The method for producing an anisotropic rare earth sintered magnet according to any of (14) to (17), wherein the sintered product is heat-treated at a temperature of 600 to 1000° C., then cooled down to at least 550° C. or lower at a cooling speed of 1° C./min or more and 50° C./min or less, and then further heat-treated at a temperature of 300 to 800° C.

According to the present invention, there can be provided an anisotropic rare earth sintered magnet having an $Nd_2Fe_{14}B$-type crystal compound as a main phase and containing Ce, and the anisotropic rare earth sintered magnet has good magnetic characteristics.

DETAILED DESCRIPTION OF THE INVENTION

Figure 1:
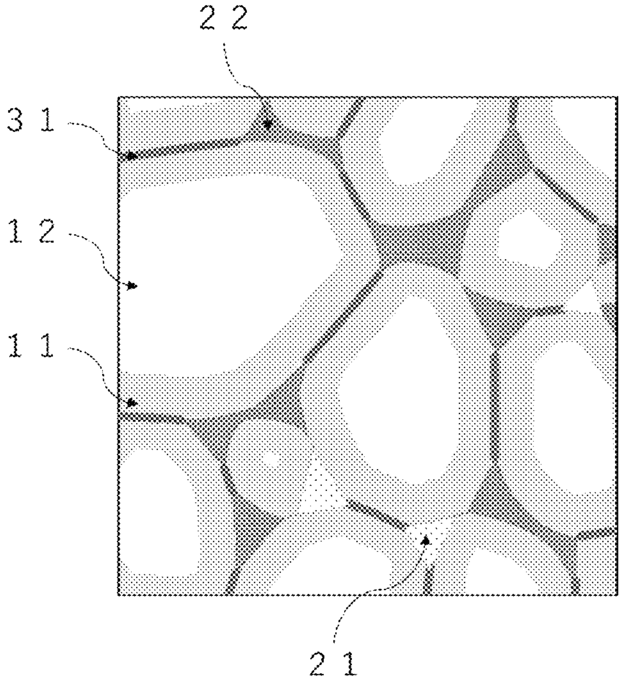
FIG. 1 is a schematic view of a structure of one example of an anisotropic rare earth sintered magnet of the present invention having an R'-rich phase and an R'$(Fe,Co)_2$ phase existing in the grain boundary part therein, produced according to a two-alloy method.

Embodiments of the present invention are described below. The magnet of the present invention is an anisotropic rare earth sintered magnet having a composition of the following formula: $R_x(Fe_{1-a}Co_a)_{100-x-y-z}B_yM_z$, in which the main phase is formed of an $Nd_2Fe_{14}B$-type compound crystal, grains that differ in the ratio of Ce/R' between the center part and the outer shell part of the grains exist in the main phase grains, and a Ce-containing R'-rich phase and a Ce-containing $R'(Fe,Co)_2$ phase exist in the grain boundary part. First, the constituent components are described below. R is two or more kinds of elements selected from rare earth elements and indispensably including Nd and Ce, M is one or more kinds of elements selected from the group consisting of Al, Si, Ti, V, Cr, Mn, Ni, Cu, Zn, Ga, Ge, Zr, Nb, Mo, Ag, In, Sn, Hf, Ta, W, Pb, and Bi. x, y, z, and a each satisfy $12 \le x \le 17$ at %, $3.5 \le y \le 6.0$ at %, $0 \le z \le 3$ at %, and $0 \le a \le 0.1$. R' is one or more kinds of elements selected from rare earth elements and indispensably including Nd.

The R'-rich phase is a phase containing more than 40 at % of R'. The $R'(Fe,Co)_2$ phase is a compound phase having an $MgCu_2$ structure and called a Laves phase.

As described above, R is two or more kinds of elements selected from rare earth elements and indispensably including Nd and Ce. Specifically, R indispensably contains Nd and Ce, and can contain one or more kinds of elements selected from Sc, Y, La, Pr, Sm, Eu, Gd, Tb, Dy, Ho, Er, Tm, Yb, and Lu. R is an element necessary for forming a compound having an $Nd_2Fe_{14}B$-type crystal structure as a main phase. The content of R is 12 at % or more and 17 at % or less. More preferably, it is 12.5 at % or more and 16 at % or less. When the content is less than 12 at %, an α-Fe phase may precipitate to disrupt sintering, but on the other hand, when the content is more than 17 at %, the volume ratio of the $Nd_2Fe_{14}B$-type compound phase lowers to disrupt good magnetic characteristics. An $Nd_2Fe_{14}B$-type compound can show especially good magnetic characteristics when R is Nd, and therefore, the anisotropic rare earth sintered magnet of the present invention indispensably contains Nd. To secure cost reduction of the magnet and stable supply of elements, the magnet indispensably contains Ce of which the element abundance ratio among rare earth elements is high. Ce contained in R in the sintered product composition is preferably 1% or more and 30% or less as an atomic ratio of R, more preferably 3% or more and 25% or less, even more preferably 5% or more and 20% or less. When the Ce ratio falls within the range, an anisotropic sintered magnet having a high residual magnetic flux density $B_r$ and a high coercive force $H_{cJ}$, and further having good $H_{cJ}$ temperature characteristics can be obtained. Here, the good $H_{cJ}$ temperature characteristics means that a temperature change of $H_{cJ}$ is small.

B is also an element indispensable for forming an $Nd_2Fe_{14}B$-type compound. The content of B is 3.5 at % or more and 6.0 at % or less. The content is more preferably 5.0 at % or more and 5.8 at % or less. When it is less than 3.5 at %, a phase that may have negative influences on the magnetic characteristics, such as an $R_2Fe_{17}$ phase and an α-Fe phase may precipitate, but on the other hand, when it is more than 6.0 at %, a different phase such as a B-rich phase may form to lower the volume ratio of the main phase, and if so, good magnetic characteristics could not be attained.

As described above, M is one or more kinds of elements selected from the group consisting of Al, Si, Ti, V, Cr, Mn, Ni, Cu, Zn, Ga, Ge, Zr, Nb, Mo, Ag, In, Sn, Hf, Ta, W, Pb, and Bi. These elements are soluble in the $Nd_2Fe_{14}B$-type compound, or form a grain boundary phase to effectively increase $H_{cJ}$, but when contained too much, the elements may lower $B_r$ of the magnet. Consequently, when the magnet contains M, the content thereof is 3 at % or less as a whole, more preferably 2 at % or less, even more preferably 1 at % or less.

The anisotropic rare earth sintered magnet of the present invention contains Fe as an indispensable constituent element along with R and B. A part of Fe can be replaced with Co. Replacement with Co is effective for increasing the Curie temperature $T_c$ of the $Nd_2Fe_{14}B$-type compound of the main phase. Replacement ratio with Co is 10% or less as an atomic ratio. When the replacement ratio is more than 10%, $M_s$ lowers conversely. The ratio of Fe and Co is a remainder of R, B and M. In addition, the other inevitable impurities that may be taken in from raw materials and may be mixed in in the production process, specifically H, C, N, O, F, P, S, Mg, Cl, Ca and the like may also be contained in the magnet, but from the viewpoint of attaining good magnetic characteristics, the content is preferably 3 wt % or less in total, more preferably 1 wt % or less. In particular, the content of C, N and 0 is 1 wt % or less in total, more preferably 0.5 wt % or less, even more preferably 0.3 wt % or less.

Next described are the phases constituting the anisotropic rare earth sintered magnet of the present invention.

The main phase in the anisotropic rare earth sintered magnet of the present invention is formed of an $Nd_2Fe_{14}B$-type crystal structure compound. The average crystal grain size of the main phase is preferably 1 μm or more and 15 μm or less, and more preferably falls within a range of 1.5 μm or more and 10 μm or less, even more preferably 2 μm or more and 5 μm or less. When the average crystal grain size falls within the range, reduction in the residual magnetic flux density $B_r$ owing to reduction in the orientation degree of the crystal grains and reduction in the coercive force $H_{cJ}$ can be prevented. The volume ratio of the main phase is, from the viewpoint of attaining good $B_r$ and $H_{cJ}$, preferably 80 vol % or more and less than 99 vol % relative to the entire magnet, more preferably 90 vol % or more and 99 vol % or less.

Regarding the crystal grain size of the main phase, a cross section of the sintered magnet is polished to have a mirror face, immersed in an etching solution (e.g., mixed solution of nitric acid+hydrochloric acid+glycerin) to selectively remove the grain boundary phase, then the resultant cross section is observed with a laser microscope at arbitrary 10 points or more, and an area of the cross section of each grain is calculated by image analysis of the observed images. The grains are regarded as circles, and the average diameter thus calculated is referred to as the average crystal grain size.

Regarding the volume ratio of the main phase and the other phases, a cross section of the sintered magnet is polished to have a mirror face, then by EPMA, the structure of the anisotropic rare earth sintered magnet is observed and the composition of each phase is analyzed to confirm the presence of the main phase, the R'-rich phase and the $R'(Fe,Co)_2$ phase, and thereafter the area ratio of the backscattered electron images is considered to be equal to the area ratio of the phases, and thus the volume ratio of the constituent phases is calculated.

An $R'_2Fe_{14}B$ compound has a highest saturation magnetization $M_s$ when R'=Nd, and in the case where a part of Nd is replaced with Ce, $M_s$ lowers more with the increase in the replacement ratio with Ce. Consequently in the magnet of the present invention, for reducing the influence of the replacement with Ce on the $B_r$ reduction of the magnet, the Ce/R' ratio (the atomic ratio of Ce to R') differs between the center part and the outer shell part of the main phase grains, and among the main phase grains therein, the Ce/R' ratio in the center part of some grains is lower than the Ce/R' ratio in the outer shall part thereof. However, some other main phase grains can have a uniform Ce concentration distribution. Here, the outer shell part indicates a region that includes the surface of the main phase grain, and the center part indicates the other inner region than the outer shell part. Having such a structure morphology, $M_s$ reduction in the region around the center of the main phase grains having a low Ce/R' ratio is retarded, and the $B_r$ reduction of the magnet owing to the replacement with Ce can be thereby lowered. More preferably, R' in the center part of the main phase grains does not contain Ce, and even more preferably, R' in the grain center part is Nd alone or is formed of Nd and Pr.

On the other hand, as will be described below, when a Ce-containing R'-rich phase and $R'(Fe,Co)_2$ phase are formed in the grain boundary part, $H_{cJ}$ at room temperature increases and the temperature-dependent change of $H_{cJ}$ lowers, and therefore the magnet can exhibit excellent magnetic characteristics. For efficiently forming these phases, the magnet of the present invention is so configured that the Ce/R' ratio in the outer shell part of the main phase grains is higher than the Ce/R' ratio in the center part thereof. Accordingly, the Ce concentration in the grain boundary part increases, and the grain boundary part can readily have the $R'(Fe,Co)_2$ phase formed therein. As opposed to this, in the case where the Ce/R' ratio in the grains is uniform, the replacement ratio with Ce in the sintered product need to be increased for the purpose of significantly forming the $R'(Fe,Co)_2$ phase, which, however, results in significant reduction in $M_s$.

When the Ce/R' ratio in the outer shell part of the grains is high, HA of the grain surface lowers, but the $H_{cJ}$ increasing effect by the Ce-containing R'-rich phase and $R'(Fe,Co)_2$ phase is great, and therefore the negative influence by the HA reduction lowers.

Contrary to the above, in the case where some main phase grains in the magnet are such that the Ce/R' ratio in the center part of the grains is higher than the Ce/R' ratio in the outer shell part thereof, the $M_s$ reduction in the region around the center of the main phase grains having a high Ce/R' ratio become significant, and therefore such is contradictory to the guideline in the magnet of the present invention. Consequently, in the magnet of the present invention, main phase grains such that the Ce/R' ratio in the center part of the grains is higher than the Ce/R' ratio in the outer shell part thereof do not exist.

The thickness of the outer shell part having a high Ce/R' ratio is not specifically limited, but is, from the viewpoint of increasing the volume ratio of the inside part of the outer shell part, preferably 1 nm to 2 μm, more preferably 2 nm to 1 μm.

The R'-rich phase and the $R'(Fe,Co)_2$ phase are formed in the grain boundary part of the magnet structure. The grain boundary part includes, for example, a two-interparticle grain boundary phase in addition to a grain boundary triple point. Here, the phase contains R' in an amount more than 40 at %. The present inventors have found that when Ce-containing R'-rich phase and $R'(Fe,Co)_2$ phase exist in the grain boundary part, $H_{cJ}$ at room temperature of the magnet increases, and further, the temperature characteristics of $H_{cJ}$ also improve. For attaining a structure with the two phases co-existing therein, the Ce/R' ratio in the structure of the sintered product is preferably 0.01 or more and 0.3 or less. When the ratio is less than 0.01, a $R'(Fe,Co)_2$ phase could not be formed, but when it is more than 0.3, an R'-rich phase could exist with difficulty. The ratio is more preferably 0.03 or more and 0.25 or less, even more preferably 0.05 or more and 0.2 or less.

The R'-rich phase and the $R'(Fe,Co)_2$ phase mainly bring about four effects. The first effect is an action of promoting sintering. At a sintering temperature, both the R'-rich phase and the $R'(Fe,Co)_2$ phase melt to be a liquid phase, therefore promoting liquid-phase sintering, and as compared with solid-phase sintering in a case not containing these phases, the liquid-phase sintering can finish more rapidly. In addition, since the R'-rich phase and the $R'(Fe,Co)_2$ phase co-exist, the liquid-phase forming temperature tends to lower as compared with that in the case where any one phase alone exists, and therefore, the liquid-phase sintering can run on more rapidly.

The second effect is cleaning of the surfaces of the main phase grains. The anisotropic rare earth sintered magnet of the present invention has a nucleation-type coercive force mechanism, and therefore the surfaces of the main phase grains are preferably smooth so as not to provide nucleation in the reverse magnetic domain. The R'-rich phase and the $R'(Fe,Co)_2$ phase play a role of smoothening the surfaces of the main phase grains in the sintering step or in the later aging step, and owing to the cleaning effect, nucleation in the reverse magnetic domain to cause coercive force reduction can be suppressed. The $R'(Fe,Co)_2$ phase has a relatively high wettability with the main phase as compared with the other phase in which R' is less than 40 at %, such as other compound phases of, for example, $R'M_3$, $R'M_2$, $R'(Fe,Co)M$ and $R'(Fe,Co)_2M_2$. In particular, when the phase co-exists along with the R'-rich phase, they can more readily cover the surfaces of the main phase grains and therefore can provide a great cleaning effect. Accordingly, it is considered that nucleation in the reverse magnetic domain can be suppressed and the coercive force at room temperature increases, and in addition, coercive force reduction at high temperatures can be suppressed to provide lowered $H_{cJ}$ temperature dependence.

The third effect is an effect of weakening the magnetic interaction between the main phase grains. A magnet having both an R'-rich phase and an $R'(Fe,Co)_2$ phase can be processed for an optimum sintering treatment or aging treatment to form a two-interparticle grain boundary phase containing a larger amount of R' than the main phase between the adjacent main phase grains. With that, the magnetic interaction between the main phase grains weakens to exhibit a coercive force, but it is considered that, when the two-interparticle grain boundary phase contains Ce, the effect of weakening the magnetic interaction between the main phase grains can increase more toward the effect of further increasing the coercive force.

The fourth effect is an effect of promoting the formation of boundary phase between the $R'(Fe,Co)_2$ phase and the main phase. In a magnet having an R'-rich phase and an $R'(Fe,Co)_2$ phase in the grain boundary part, a thin boundary phase can be formed also between the $R'(Fe,Co)_2$ phase and the main phase grains not only between the main phase grains, by optimizing the sintering and the later heat treatment according to the composition and the other condition of, for example, a powder grain size. In the magnet of the present invention, the R'(Fe,Co)$_2$ phase is a magnetic phase, but when the thin boundary phase is formed therein, the magnetic interaction between the R'(Fe,Co)$_2$ phase and the main phase can weaken to provide a high coercive force.

In a magnet not having an R'-rich phase in the grain boundary part, the thin boundary phase between the R'(Fe,Co)$_2$ phase and the main phase grains and also the two-interparticle grain boundary phase are difficult to form, or the surfaces of the main phase grains could hardly have a structure completely covered with these, and therefore the magnet of the type can hardly have a sufficient coercive force.

As mentioned above, the R'-rich phase contains R' in an amount of at least more than 40 at %, When the R' content is more than 40 at %, the wettability with the main phase betters to more readily provide the above-mentioned effect. The R' content is more preferably 50 at % or more, even more preferably 60 at % or more. The R'-rich phase can be an R'-metal phase, or can also be an amorphous phase or an intermetallic compound having a high R' composition and having a low melting point, such as R'$_3$(Fe,Co,M), R'$_2$(Fe,Co,M), R'$_5$(Fe,Co,M)$_3$, or R'(Fe,Co,M). The phase can also contain Fe, Co and M elements and impurity elements such as H, B, C, N, O, F, P, S, Mg, Cl, and Ca in an amount of up to less than 60 at % in total.

When the Ce/R' ratio in the R'-rich phase is higher, the effect of reducing the magnetic interaction between the main phase grains increases more. Consequently, for making Ce more efficiently act to improve the magnetic characteristics, the Ce/R' ratio in the R'-rich phase is preferably higher than the Ce/R' ratio in the main phase grain outer shell part.

On the other hand, the R'(Fe,Co)$_2$ phase is an MgCu$_2$-type crystal Laves compound, and in consideration of measurement fluctuation in composition analysis with EPMA or the like, the R' content therein is defined to be 20 at % or more and less than 40 at %. Apart of Fe and Co can be replaced with an M element. However, the replacement ratio with M falls within a range of sustaining the MgCu$_2$-type crystal structure.

The R'(Fe,Co)$_2$ phase in the anisotropic rare earth sintered magnet of the present invention is a magnetic phase. The magnetic phase as referred to herein is a phase showing ferromagneticity or ferrimagneticity and having a Curie temperature $T_c$ of room temperature (23° C.) or higher. R'Fe$_2$ has $T_c$ of room temperature or higher, except CeFe$_2$, and when 10% or more of R' in CeFe$_2$ is replaced with any other element, $T_c$ of the compound is room temperature or higher. On the other hand, R'Co$_2$ has $T_c$ of room temperature or lower or it is a paramagnetic phase, except GdCo$_2$. However, in the anisotropic rare earth sintered magnet of the present invention, the Fe replacement ratio with Co is 0.1 or less, and therefore in almost all cases, the R'(Fe,Co)$_2$ phase is a magnetic phase. In general, a soft magnetic phase contained in a structure may often have some negative influences on magnetic characteristics, but in the anisotropic rare earth sintered magnet of the present invention, the cleaning effect for the surfaces of the main phase grains by the R'(Fe,Co)$_2$ phase and the effect of forming a two-interparticle grain boundary phase are great, and it is considered that even the magnetic phase can contribute toward increasing the room temperature $H_{cJ}$ and reducing the $H_{cJ}$ temperature dependence.

In the R'(Fe,Co)$_2$ phase, R' of Nd and Pr alone can hardly exist stably, and the phase containing Ce can be formed as an equilibrium phase in the grain boundary part. Consequently, the Ce/R' ratio in the R'(Fe,Co)$_2$ phase is preferably higher than the Ce/R' ratio in the main phase grain outer shell part.

The amount of formation of the R'-rich phase and the R'(Fe,Co)$_2$ phase is preferably 1 vol % or more in total, more preferably 1 vol % or more and less than 20 vol %. Even more preferably, the amount is 1.5 vol % or more and less than 15 vol %, and further more preferably falls within a range of 2 vol % or more and less than 10 vol %. Also preferably, the amount of the R'-rich phase and that of the R'(Fe,Co)$_2$ phase each are 0.5 vol % or more. Falling within the range, the area to be in contact with the main phase grains can be secured to readily provide the $H_{cJ}$ increasing effect. In addition, $B_r$ reduction can be suppressed and desired magnetic characteristics can be readily attained.

In a more preferred structure of the sintered magnet of the present invention, a thin boundary phase is formed between the R'(Fe,Co)$_2$ phase and the main phase. By separating the R'(Fe,Co)$_2$ phase and the main phase from each other by the thin boundary phase, the magnetic interaction between the two phases can weaken to further increase the room temperature $H_{cJ}$, and suppress the $H_{cJ}$ temperature dependence.

The boundary phase can be an amorphous phase having a randomized atomic arrangement, or can have atomic arrangement regularity. When the boundary phase is observed with a device such as STEM (scanning transmission electron microscope), the composition contains R' in an amount of 20 at % or more. When the R' content is 20 at % or more, the boundary phase can readily secure the coercive force increasing effect. The R' content is more preferably 25 at % or more, even more preferably 30 at % or more. In addition to R', and Fe, Co and M, the phase can contain other elements such as C, N and O.

The thickness of the boundary phase is preferably 0.1 nm or more and 20 nm or less. Falling within the range, the magnetic interaction between the R'(Fe,Co)$_2$ phase and the main phase can effectively weaken, and the volume reduction of the main phase owing to the formation of the boundary phase can be suppressed. The thickness is more preferably 0.2 nm or more and 10 nm or less, even more preferably 0.5 nm or more and 5 nm or less.

Ce/R' in the thin boundary phase formed between the R'(Fe,Co)$_2$ phase and the main phase is preferably higher than Ce/R' in the two-interparticle grain boundary phase formed between the main phase grains. The boundary phase is adjacent to the R'(Fe,Co)$_2$ phase containing a large amount of Ce, and can therefore stably realize a high Ce/R' composition. When Ce/R' is higher, the magnetic interaction can be effectively weakened, and therefore when the area of the main phase grain surface covered with the phase increases, the magnet can exhibit a further higher room temperature $H_{cJ}$. Ce/R' in the boundary phase is preferably 0.2 or more, more preferably 0.3 or more, even more preferably 0.35 or more.

As in the above, in a structure morphology where a boundary phase having a high ratio Ce/R' is formed between the main phase grain and the R'(Fe,Co)$_2$ phase, the magnetic interaction between the main phase and the R'(Fe,Co)$_2$ phase can weaken, and the magnet having such a structure morphology secures a high room temperature $H_{cJ}$ and suppressed $H_{cJ}$ temperature dependence.

The thickness of the boundary phase formed between the R'(Fe,Co)$_2$ phase and the main phase and the thickness of the two-interparticle grain boundary phase between the main phase grains can be measured, for example, using a STEM apparatus (JEM-ARM200F by JEOL Corporation). Briefly, the part where the main phase grains are adjacent to each other, and the part where the $R'(Fe,Co)_2$ phase and the main phase are adjacent to each other are observed with the device, and the thickness can be calculated from the resultant HAADF (high-angle annular dark field) images.

In addition, the anisotropic rare earth sintered magnet of the present invention can contain R' oxides, R' carbides, R' nitrides, R' oxycarbides, and M carbides and the like formed with C, N and 0 inevitably mixed thereinto. From the viewpoint of suppressing degradation of magnetic characteristics, the volume ratio of these is preferably 10 vol % or less, more preferably 5 vol % or less.

The amount of the other phases than the above is preferably small, and for example, a B-rich phase represented by $R'_{1+\varepsilon}(Fe,Co)_4B_4$ is preferably 5 vol % or less for the purpose of suppressing the volume reduction of the main phase, the R'-rich phase and the $R'(Fe,Co)_2$ phase. Also from the viewpoint of preventing any significant reduction in the magnetic characteristics thereof, preferably, the anisotropic rare earth sintered magnet of the present invention does not contain an $\alpha$-(Fe,Co) phase and an $R'_2(Fe,Co,M)_{17}$ phase.

Next described is a production method. The anisotropic rare earth sintered magnet of the present invention is produced according to a powder metallurgy process, and as a method for producing a magnet having a structure where the Ce/R' ratio differs between the center part and the outer shell part of the main phase grains, for example, there can be mentioned examples of a two-alloy method and a grain boundary diffusion method.

First, for producing raw material alloys, metal materials, alloys or ferroalloys with R', Fe, Co and M are prepared. In consideration of material loss and the like in the production process, the raw material alloys are controlled so that the sintered product to be produced finally can have a predetermined composition. These materials are melted in a high-frequency furnace, an arc furnace or the like to prepare alloys. For cooling the molten alloys, a casting method can be employed, or thin flakes can be formed in a strip casting method. In the case of a strip casting method, preferably, the cooling speed is controlled to produce alloys in which the average crystal grain size of the main phase or the average grain boundary phase space can be 1 μm or more. When it is less than 1 μm, the powder after fine grinding may be polycrystalline, and if so, the main phase crystal grains cannot be sufficiently aligned in a process of molding in a magnetic field to lower $B_r$. The average crystal grain size can be calculated, for example, by polishing the cross section of an alloy, then etching it and thereafter observing the structure of the alloy. 20 parallel lines are drawn on the roll contact surface at regular intervals, and the number of the intersections of these lines crossing the grain boundary phase part removed by etching is counted for calculation. In the case where $\alpha$-Fe precipitates in the alloy, the alloy may be heat-treated so as to remove $\alpha$-Fe to thereby increase the amount of the $Nd_2Fe_{14}B$-type compound phase to be formed.

The above-mentioned raw material alloy is roughly ground by mechanical grinding with a Braun mill or hydrogenation grinding to give a powder having an average grain diameter of 0.05 to 3 mm. An HDDR method (hydrogenation-disproportionation-desorption-recombination method) is also employable. Further, the roughly ground powder is finely ground with a ball mill or a jet mill using high-pressure nitrogen into a powder having an average grain diameter of 0.5 to 20 μm, more preferably 1 to 10 μm. A lubricant or the like may be added, as needed, before or after the finely grinding step.

In the case of using a two-alloy method, two kinds of raw material alloys differing in the composition are prepared. Three or more kinds of alloys can be used. At that time, preferably, an alloy A mainly composed of an $Nd_2Fe_{14}B$-type compound phase and having a relatively low Ce/R' ratio, and an alloy B having a relatively higher R' composition ratio and a relatively higher Ce/R' ratio than the former are combined, and the two are so controlled that the average composition can be a predetermined composition. These alloys are prepared by a casting method or a strip casting method, and then ground. The step of mixing the alloy powders can be carried out while they are roughly ground but are not as yet finely ground, or can be carried out after they are finely ground.

Next, using a magnetic-field pressing device, the alloy powder is molded while the easy axis of the alloy powder is oriented in the magnetic field applied, thereby giving a powder-compression molded article. Preferably, the molding is performed in vacuum or in a nitrogen gas atmosphere or an inert gas atmosphere such as Ar, for preventing oxidation of the alloy powder.

The step of sintering the powder-compression molded article is carried out in vacuum or in an inert atmosphere using a sintering furnace, at a temperature of 800° C. or higher and 1200° C. or lower. At a temperature lower than 800° C., sintering can hardly go on and therefor a high sintered density cannot be obtained, but when the temperature is higher than 1200° C., a main phase of a $Nd_2Fe_{14}B$-type compound decomposes to give a precipitate of $\alpha$-Fe. In particular, the sintering temperature is preferably within a range of 900 to 1100° C. The sintering time is preferably 0.5 to 20 hours, more preferably 1 to 10 hours. The sintering can be a pattern of heating followed by keeping at a constant temperature, or can be a two-stage sintering pattern of heating up to a first sintering temperature followed by keeping at a lower second sintering temperature for a predetermined period of time for attaining finely ground crystal grains. Plural times of sintering can be carried out, or a discharge plasma sintering method is also applicable. The cooling speed after the sintering is not specifically limited, but preferably at a cooling speed of 1° C./min or more and 100° C./min or less, more preferably 5° C./min or more and 50° C./min or less, the cooling can be carried out at least down to 600° C. or lower, preferably 200° C. or lower. For improving the room temperature coercive force and the temperature characteristics of the coercive force, preferably, aging heat treatment at 300 to 800° C. for 0.5 to 50 hours is carried out. After the aging heat treatment, cooling can be carried out at least down to 200° C. or lower, preferably down to 100° C. or lower, at a cooling speed of preferably 1° C./min or more and 100° C./min or less, more preferably 5° C./min or more and 50° C./min or less. The aging heat treatment can be carried out plural times. Between the sintering heat treatment and the aging heat treatment, intermediate heat treatment can be carried out at 600 to 1000° C. for 0.5 to 50 hours.

For forming a thin boundary phase between the main phase grains and the $R(Fe,Co)_2$ grain boundary phase, cooling is preferably carried out after the intermediate heat treatment, at least down to 550° C. or lower, preferably down to 400° C. or lower, at a cooling speed of 1° C./min or more and 50° C./min or less, preferably 2° C./min or more and 30° C./min or less.

By carrying out the intermediate heat treatment and the aging heat treatment under the optimum conditions in accordance with the composition and the powder particle size, an R'-rich phase and an $R'(Fe,Co)_2$ phase are formed in the grain boundary part. In a more preferred case, a two-interparticle grain boundary phase is formed between adjacent main phase grains, and further a thin boundary phase is formed between the R'(Fe,Co)$_2$ phase and the main phase grains. This brings about increase in the room temperature coercive force and improvement of the temperature characteristics of the coercive force. By cutting and polishing the sintered product to have a predetermined shape, and then magnetizing, a sintered magnet is given.

As shown in FIG. 1, in a sintered magnet by a two-alloy method, a main phase of an $Nd_2Fe_{14}B$-type compound is formed mainly by the components of the alloy A, and an R'-rich phase and an R'(Fe,Co)$_2$ phase, and an outer shell part of the main phase grains 12 are formed mainly by the components of the alloy B. Consequently, the atomic ratio Ce/R' in the R'-rich phase and the R'(Fe,Co)$_2$ phase formed in the grain boundary part 31 is higher than the atomic ratio Ce/R' inside the main phase grains. Apart of Ce in the grain boundary part 31 replaces the R' atom in the surface layer part of the main phase grain 12 to form a core/shell structure where the Ce concentration differs between the center part and the outer shell part.

On the other hand, in a grain boundary diffusion method, first a sintered product is produced by a one-alloy method or a two-alloy method. At that time, preferably, R' in the sintered product composition does not contain Ce.

Next, the resultant sintered product is subjected to grain boundary diffusion of Ce. As needed, the sintered product is cut and polished, and then, on the surface thereof, a diffusion material selected from a Ce-containing metal, and a Ce-containing compound such as an alloy, an oxide, a fluoride, an oxyfluoride, a hydride or a carbide with Ce is put as a powder, a thin film, a thin strip or a foil. For example, a powder of the above-mentioned material is mixed with water or an organic solvent or the like to give a slurry, and this can be applied onto the sintered product by coating, and then dried, or according to vapor deposition, sputtering or CVD, the above-mentioned substance can be put on the surface of the sintered product as a thin film. The amount to be put is preferably 10 to 1000 μg/mm$^2$, more preferably 20 to 500 μg/mm$^2$. Falling within the range, $H_{cJ}$ can be sufficiently increased and $B_r$ reduction by Ce can be suppressed.

Figure 2:
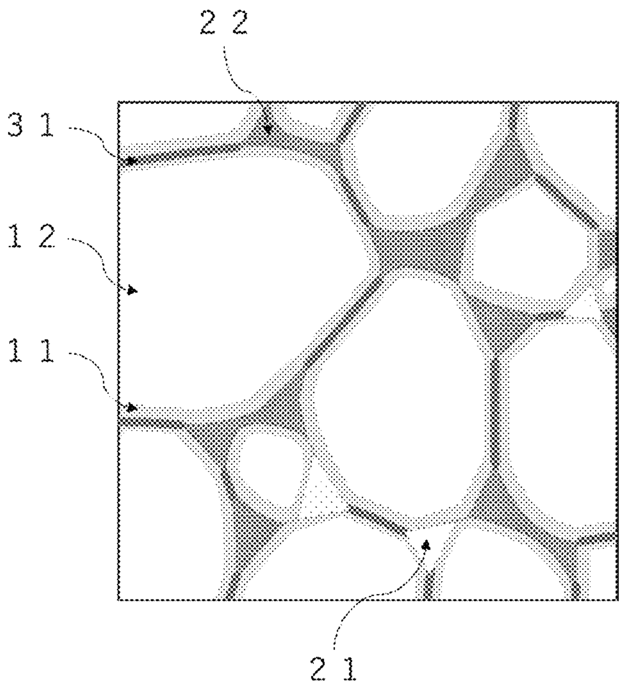
FIG. 2 is a schematic view of a structure of one example of an anisotropic rare earth sintered magnet of the present invention having an R'-rich phase and an R'$(Fe,Co)_2$ phase existing in the grain boundary part therein, produced according to a grain boundary diffusion method.
Figure 3:
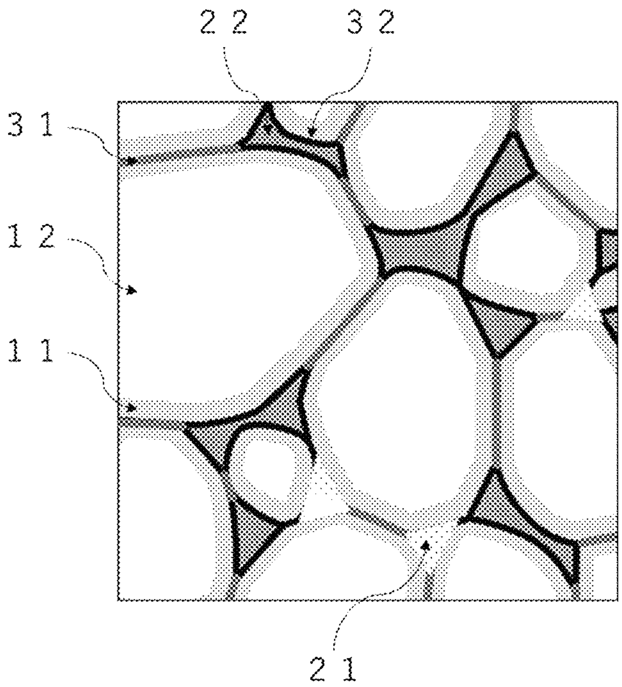
FIG. 3 is a schematic view of a structure of one example of an anisotropic rare earth sintered magnet of the present invention, in which an R'-rich phase and an R'$(Fe,Co)_2$ phase exist in the grain boundary part, and a boundary phase is formed between the main phase and the R'$(Fe,Co)_2$ phase.

The sintered product with Ce put on the surface thereof is heat-treated in vacuum or in an inert gas atmosphere. The heat treatment temperature is preferably 600° C. or higher and equal to or lower than the sintering temperature, more preferably 700° C. or higher and 1000° C. or lower. The heat treatment time is preferably 0.5 to 50 hours, more preferably 1 to 20 hours. The cooling speed after the heat treatment is not specifically limited, but is preferably 1 to 20° C./min, more preferably 2 to 10° C./min. Ce put on the sintered product diffuses into the inside of the sintered product via the grain boundary part by this diffusion heat treatment. At that time, as shown in FIG. 2, the R' atom in the surface layer part of the main phase grains 12 is replaced with Ce, whereby a core/shell structure is formed in which the Ce/R' ratio differs between the center part and the outer shell part of the main phase grains 12, and a Ce-containing R'-rich phase and a Ce-containing R'(Fe,Co)$_2$ phase are formed in the grain boundary part 31 to result in $H_{cJ}$ increase.

The diffusion heat-treated sintered product is preferably further subjected to aging heat treatment at 300 to 800° C. for 0.5 to 50 hours, for improving the room temperature coercive force and the temperature characteristics of coercive force, like in the two-alloy method.

For forming a thin boundary phase between the main phase grains and the R'(Fe,Co)$_2$ grain boundary phase, the sintered product after diffusion treatment can be subjected to the same intermediate heat treatment like in the two-alloy method, but in this case, the intermediate heat treatment can be omitted when included in the diffusion heat treatment. By carrying out an optimum heat treatment in accordance with the sintered product composition and the powder grain size and with the diffusion materials and the like, an R'-rich phase and an R'(Fe,Co)$_2$ phase are formed in the grain boundary part and further a thin boundary phase is formed between the R'(Fe,Co)$_2$ phase and the main phase grains. In a more preferred case, a two-interparticle grain boundary phase is formed between adjacent main phase grains to increase the room temperature coercive force and improve the temperature characteristics of coercive force.

For further improving magnetic characteristics, diffusion heat treatment can be carried out by putting Dy and Tb on the surface of the sintered product separately or together with Ce.

Thus produced, the anisotropic rare earth sintered magnet of the present invention shows, at room temperature, a residual magnetic flux density $B_r$ of at least 12 kG or more and a coercive force $H_{cJ}$ of 10 kOe or more. The temperature coefficient β of coercive force is characterized by $\beta \geq (0.01 \times H_{cJ(room\ temperature)} - 0.720)$%/K. Here, $\beta = \Delta H_{cJ}/\Delta T \times 100/H_{cJ((room\ temperature)}$, $(\Delta H_{cJ} = H_{cJ((room\ temperature)} - H_{cJ(140°\ C.)}$, $\Delta T$=room temperature−140(° C.)). More preferably, $\beta \geq (0.01 \times H_{cJ((room\ temperature)} - 0.7)$%/K. Of the anisotropic rare earth sintered magnet of the present invention, the temperature change of the coercive force is small as compared with that of an Nd—Fe—B sintered magnet containing no Ce, and therefore the anisotropic rare earth sintered magnet of the present invention is suitable in use at high temperatures.

EXAMPLES

Hereinunder the present invention is described specifically by showing Examples and Comparative Examples, but the present invention is not limited to the following Examples.

Example 1

Using an Nd metal, a Pr metal, an electrolytic iron, a Co metal, a ferroboron, an Al metal and a Cu metal, a composition was controlled to have Nd 10.6 at %, Pr 2.7 at %, Co 1.0 at %, B 6.0 at %, Al 0.5 at %, Cu 0.1 at % and a balance Fe, then using a high-frequency induction furnace, this was melted in an Ar gas atmosphere, and strip-cast on a water-cooling Cu roll rotating at a peripheral speed of 2 m/sec to produce an alloy thin strip having a thickness of approximately 0.2 to 0.4 mm. The cross section of the alloy was polished and etched, and the structure thereof was observed with a laser microscope (LEXT OLS4000, by Olympus Corporation). A position of about 0.15 mm from the surface of the chill roll at which the thin strip had been brought into contact with the chill roll, and 20 points at that position were observed. On each image, 20 parallel lines were drawn on the roll contact surface at regular intervals, and the number of the intersections of these lines crossing the grain boundary phase part removed by etching was counted to calculate an average grain boundary phase distance, which was 4.7 μm. The alloy was processed for hydrogen absorption treatment at room temperature, and then dehydrogenated by heating at 400° C. in vacuum to prepare a coarse powder (this is referred to as an example 1A powder). Next, using a Ce metal and an electrolytic iron as raw materials, these were melted to give an alloy ingot having a controlled composition of Ce 33 at % and a balance Fe, using a high-frequency induction furnace. The alloy ingot was heat-treated at 870° C. for 20 hours, and then mechanically ground to give a coarse powder (this is referred to as an example 1B powder). The example 1A powder and the example 1B powder were mixed in a weight ratio of 93/7, and then ground with a jet mill in a nitrogen stream to give a fine powder having an average grain size of 3.1 μm. Next, the fine powder was filled in a mold of a molding apparatus in an inert gas atmosphere, and while kept oriented in a magnetic field of 15 kOe (=1.19 MA/m), this was compression-molded under a pressure of 0.6 ton/cm$^2$ in the direction vertical to the magnetic field. The resultant powder-compression molded article was sintered in vacuum at 1040° C. for 3 hours, then cooled down to room temperature, and once taken out of a heat treatment furnace. Further, this was heat-treated at 510° C. for 2 hours to give a sintered product sample of Example 1.

The resultant sintered product sample was analyzed according to a high-frequency inductively coupled plasma optical emission spectrometry (ICP-OES), using a high-frequency inductively coupled plasma optical emission spectrometer (SPS3520UV-DD, by Hitachi High-Tech Science Corporation). As a result, the composition thereof was $Nd_{9.9}Pr_{2.5}Ce_{1.8}Fe_{bal.}Co_{1.0}B_{5.6}Al_{0.5}Cu_{0.1}$. A part of the sample was ground, and the resultant powder was analyzed by X-ray diffractometry, which confirmed that the main phase has a crystal structure of $Nd_2Fe_{14}B$. Using an EPMA apparatus (JXA-8500F, by JEOL Corporation), the structure of the sintered product was observed, and the phases therein were analyzed for the composition. As a result, the main phase grains had a core/shell structure differing in the composition between the center part and the outer shell part. R' in the center part corresponding to the core did not contain Ce, and R' in the grain outer shell part contained Ce. In addition, it was confirmed that an R'-rich phase and an R'(Fe,Co)$_2$ phase existed in the grain boundary part each in an amount of 1 vol % or more. The volume ratio of the phases was calculated as equal to the area ratio in the backscattered electron image. An α-Fe phase and an $R'_2$(Fe,Co,M)$_{17}$ phase were not detected. Since oxide phases existed, the total of the phase ratios did not reach 100%. Based on the analysis value of the R'(Fe,Co)$_2$ phase, an alloy having the same composition was produced by arc melting, then homogenized at 800° C. for 10 hours, and subjected to magnetization-temperature measurement by VSM. The Curie temperature $T_c$ was 66° C.

The sintered product sample was etched and observed, and as calculated from the observed results in the manner as above, the average crystal grain size of the main phase was 4.3 μm. The magnetic characteristics were measured with a B—H tracer, and at room temperature, $B_r$ was 14.0 kG, and $H_{cJ}$ was 13.6 kOe. The temperature coefficient β of $H_{cJ}$ was −0.575%/K. Table 1 shows the ICP composition analysis data, the average crystal grain size and the main phase crystal structure of the sintered product. Table 2 shows the conditions of sintering heat treatment and aging heat treatment, and the results of magnetic characteristics measured with a B—H tracer. Table 3 shows the composition analysis data of the constituent phases measured by EPMA.

Comparative Example 1

Using an Nd metal, a Pr metal, a Ce metal, an electrolytic iron, a Co metal, a ferroboron, an Al metal and a Cu metal, a composition was controlled, from which an alloy strip was produced by strip casting. The average grain boundary phase distance calculated on the cross section image of the alloy was 4.4 μm. The alloy was processed for hydrogen absorption treatment and dehydrogenation by heating at 400° C. in vacuum to prepare a coarse powder, and then ground with a jet mill in a nitrogen stream to give a fine powder having an average grain size of 3.1 μm. This was compression-molded in a magnetic field to give a powder-compression molded article, which was then sintered in vacuum at 1040° C. for 3 hours, then cooled down to room temperature, and once taken out of a heat treatment furnace. Further, this was heat-treated at 510° C. for 2 hours to give a sintered product sample of Comparative Example 1.

By ICP analysis, the composition of the sintered product of Comparative Example 1 was $Nd_{10.0}Pr_{2.6}Ce_{1.8}Fe_{bal.}Co_{1.0}B_{5.6}Al_{0.4}Cu_{0.1}$. By X-ray diffractometry, it was confirmed that the main phase had an $Nd_2Fe_{14}B$-type crystal structure. Using an EPMA apparatus, the structure was observed and the composition of each phase was analyzed, and as a result, the composition inside the main phase grains was almost uniform, and there was no difference in the Ce concentration between the center part and the outer shell part. An R'-rich phase existed in the grain boundary part, but an R'(Fe,Co)$_2$ phase could not be confirmed. The average crystal grain size of the main phase was 4.0 μm. The magnetic characteristics were measured with a B—H tracer, and at room temperature, $B_r$ was 13.7 kG, and $H_{cJ}$ was 9.8 kOe. The temperature coefficient β of $H_{cJ}$ was −0.641%/K. The results are shown in Tables 1 to 3.

Example 2, Comparative Example 2

In Example 2, an alloy strip was produced by strip casting in the same manner as in Example 1, having a composition of Nd 12.8 at %, Co 1.0 at %, B 5.9 at %, Al 0.2 at %, Zr 0.05 at % and a balance of Fe, having a thickness of approximately 0.2 to 0.4 mm, and an average grain boundary phase distance of 3.9 μm. This was processed for hydrogen absorption and dehydrogenation to prepare a coarse powder (example 2A powder). On the other hand, an alloy controlled to have a composition of Ce 80 at %, Cu 10 at % and a balance of Fe was melted in a quartz tube using a high-frequency induction furnace, and then jetted out onto a Cu roll rotating at a peripheral speed of 23 m/sec to produce a rapidly quenched alloy strip having a thickness of approximately 100 to 250 μm. The alloy strip was ground with a ball mill to give a coarse powder (example 2B powder). The example 2A powder and the example 2B powder were mixed in a weight ratio of 96/4, and then ground with a jet mill in a nitrogen stream to give a fine powder having an average grain size of 2.8 μm. This was compression-molded in a magnetic field to give a powder-compression molded article, then sintered in vacuum at 1020° C. for 2 hours, cooled down to room temperature, once taken out of a heat treatment furnace, and further heat-treated at 530° C. for 4 hours to give a sintered product sample of Example 2.

In Comparative Example 2, an alloy strip was produced by strip casting, having a composition of Nd 7.8 at %, Ce 5.0 at %, Co 1.0 at %, B 5.9 at %, Al 0.2 at %, Zr 0.05 at % and a balance of Fe, having a thickness of approximately 0.2 to 0.4 mm, and an average grain boundary phase distance of 4.2 μm. This was processed for hydrogen absorption and dehydrogenation to prepare a coarse powder (comparative 2A powder). On the other hand, an alloy controlled to have a composition of Nd 80 at %, Cu 10 at % and a balance of Fe was melted in a quartz tube using a high-frequency induction furnace, and then jetted out onto a Cu roll rotating at a peripheral speed of 22 m/sec to produce a rapidly quenched alloy strip having a thickness of approximately 100 to 250 μm. The alloy strip was ground with a ball mill to give a coarse powder (comparative 2B powder). The comparative 2A powder and the comparative 2B powder were mixed in a weight ratio of 96/4, and then ground with a jet mill in a nitrogen stream to give a fine powder having an average grain size of 2.8 μm. This was compression-molded in a magnetic field to give a powder-compression molded article, then sintered in vacuum at 1020° C. for 2 hours, cooled down to room temperature, once taken out of a heat treatment furnace, and further heat-treated at 530° C. for 4 hours to give a sintered product sample of Comparative Example 2.

By ICP analysis, the compositions of the sintered products of Example 2 and Comparative Example 2 were $Nd_{12.4}Ce_{1.7}Fe_{bal.}Co_{1.0}B_{5.7}Al_{0.1}Cu_{0.2}Zr_{0.1}$ and $Nd_{9.2}Ce_{4.9}Fe_{bal.}Co_{0.9}B_{5.8}Al_{0.1}Cu_{0.2}Zr_{0.1}$, respectively. As a result of structure observation, in Example 2, many main phase grains not containing Ce in the center part and containing Ce in the grain outer shell part existed, and in the grain boundary part, an R'-rich phase and an $R'(Fe,Co)_2$ phase existed each in an amount of 1 vol % or more. An alloy having the same composition, as prepared by arc melting on the basis of the analysis values of the $R'(Fe,Co)_2$ phase, had $T_c$ of 74° C. On the other hand, in Comparative Example 2, both the center part and the outer shell part of the main phase grains contained Ce, and the ratio of Ce/R' was higher in the grain center part than in the grain outer shell part. In the grain boundary part, an $R'(Fe,Co)_2$ phase and an $R'Cu_2$ phase were formed, and an R'-rich phase could not be confirmed. The average crystal grain size of the main phase was 3.8 μm in Example 2 and was 3.6 μm in Comparative Example 2. The results are shown in Tables 1 to 3. In Example 2, both the room temperature magnetic characteristics and the temperature characteristics of $H_{cJ}$ were better than those in Comparative Example 2.

Examples 3 to 51

In Example 3, a strip-cast alloy having a controlled composition of Nd 13.0 at %, B 6.1 at % and a balance of Fe, and an arc-melted alloy having a controlled composition of Ce 70 at %, La 5 at %, Ni 6 at % and a balance of Al were produced. In the same manner as in Example 1, the alloys were mixed as coarse powders in a weight ratio of 94/6. Using this, a powder-compression molded article was produced by jet mill grinding and compression molding in a magnetic field, and then sintered in vacuum at 1010° C. for 3 hours. Subsequently, this was subjected to aging heat treatment at 480° C. for 1 hour to prepare a sintered product sample.

In Example 4, a strip-cast alloy having a controlled composition of Nd 12.8 at %, B 6.0 at %, Al 10.5 at %, Cr 0.2 at %, Ti 0.3 at % and a balance of Fe, and a cast alloy having a controlled composition of Ce 28 at %, Gd 7 at %, Co 30 at % and a balance of Fe were produced. In the same manner as in Example 1, the alloys were mixed as coarse powders in a weight ratio of 90/10. Using this, a powder-compression molded article was produced by jet mill grinding and compression molding in a magnetic field, and then sintered in vacuum at 1030° C. for 1.5 hours. The resultant sintered product was heat-treated at 900° C. for 1 hour, then cooled down to 500° C. or lower at a cooling speed of 3.8° C./min, and subjected to aging heat treatment at 600° C. for 3 hours to prepare a sintered product sample.

In Example 5, a strip-cast alloy having a controlled composition of Nd 13.0 at %, B 6.0 at % and a balance of Fe, and an arc-melted alloy having a controlled composition of Ce 56 at %, Y 9 at %, Si 10 at %, Ga 8 at % and a balance of Co were produced. In the same manner as in Example 1, the alloys were mixed as coarse powders in a weight ratio of 95/5. Using this, a powder-compression molded article was produced by jet mill grinding and compression molding in a magnetic field, and then sintered in vacuum at 1060° C. for 2 hours. The resultant sintered product was heat-treated at 960° C. for 2 hours, then cooled down to 500° C. or lower at a cooling speed of 4.5° C./min, and subjected to aging heat treatment at 680° C. for 3 hours to prepare a sintered product sample.

The results of Examples 3 to 5 are shown in Tables 1 to 3. In the structures of all these sintered products, there existed many main phase grains not containing Ce in the grain center part and containing Ce in the grain outer shell part, and in the grain boundary part, an R'-rich phase and an $R'(Fe,Co)_2$ phase existed in an amount of 1 vol % or more in total. The magnetic characteristics of the all were: room temperature $H_{cJ}$ 10 kOe or more, and $H_{cJ}$ temperature coefficient β $(0.01\lambda H_{cJ(room\ temperature)}-0.720)$%/K or more, and the all had good magnetic characteristics.

Example 6, Comparative Example 3

Using an Nd metal, an electrolytic iron, a Co metal, a ferroboron, and an Al metal, a composition was controlled, from which an alloy strip was produced by strip casting. The average grain boundary phase distance calculated on the cross section image of the alloy was 4.8 μm. The alloy was processed for hydrogen absorption treatment and dehydrogenation by heating at 400° C. in vacuum to prepare a coarse powder, and then ground with a jet mill in a nitrogen stream to give a fine powder having an average grain size of 3.5 μm. This was compression-molded in a magnetic field to give a powder-compression molded article, which was then sintered in vacuum at 1040° C. for 3 hours. The resultant sintered product was cut into a size of 10×10×3 mm.

Next, using a high-frequency induction furnace, raw materials of a Ce metal, a Dy metal, an electrolytic iron, a Co metal and a Cu metal were produced into an alloy ingot having a controlled composition of Ce 25 at %, Dy 8 at %, Co 30 at %, Cu 10 at % and a balance of Fe, then the alloy ingot was heat-treated at 420° C. for 20 hours, and ground with a ball mill to give a powder having an average grain size of 14.6 μm. The powder was mixed with ethanol in a weight ratio of 1/1, and stirred to give a slurry, and the above-mentioned sintered product was immersed in the liquid, drawn out, and dried with a fan dryer to apply the powder onto the surface of the sintered product. The sample was processed for diffusion heat treatment at 870° C. in vacuum for 10 hours, then cooled down to 500° C. or lower at a cooling speed of 5° C./min, and further subjected to aging heat treatment in an Ar gas atmosphere at 560° C. for 2 hours to prepare a sintered product sample of Example 6. On the other hand, the powder coating and the diffusion heat treatment were omitted, and only the aging heat treatment in an Ar gas atmosphere at 560° C. for 2 hours was provided to prepare a sintered product sample of Comparative Example 3.

By ICP analysis, the compositions of the sintered products of Example 6 and Comparative Example 3 were $Nd_{13.6}Dy_{0.1}Ce_{0.6}Fe_{bal.}Co_{1.2}B_{5.8}Al_{0.2}Cu_{0.1}$, and $Nd_{14.0}Fe_{bal.}Co_{0.4}B_{6.0}Al_{0.1}$, respectively. As a result of EPMA structure observation at a depth of 500 μm from the surface of the sintered product, in Example 6, many main phase grains not containing Ce in the center part and containing Ce in the grain outer shell part existed, and in the grain boundary part, an R'-rich phase and an R'(Fe,Co)$_2$ phase existed each in an amount of 1 vol % or more. An alloy having the same composition, as prepared by arc melting on the basis of the analysis values of the R'(Fe,Co)$_2$ phase, had $T_c$ of 131° C. On the other hand, in Comparative Example 3, Ce did not exist and an R'-rich phase existed in the grain boundary part, but an R'(Fe,Co)$_2$ phase could not be confirmed. The average crystal grain size of the main phase was 4.6 μm in both Example 6 and Comparative Example 3. The results are shown in Tables 1, 2 and 4. In Example 6, the temperature characteristics of $H_{cJ}$ were better than those in Comparative Example 3.

Examples 7 to 91

In Example 7, using an Nd metal, a Pr metal, an electrolytic iron, a Co metal, a ferroboron, an Al metal, a pure silicon, and an Nb metal, an alloy strip was prepared by strip casting, having a controlled composition of Nd 11.6 at %, Pr 2.9 at %, B 5.7 at %, Co 1.0 at %, Al 0.3 at %, Si 0.3 at %, Nb 0.5 at % and a balance of Fe. The average grain boundary phase distance calculated on the cross section image of the alloy was 4.4 μm. The alloy was processed for hydrogen absorption treatment and dehydrogenation by heating at 400° C. in vacuum to prepare a coarse powder, and then ground with a jet mill in a nitrogen stream to give a fine powder having an average grain size of 3.1 μm. This was compression-molded in a magnetic field to give a powder-compression molded article, which was then sintered in vacuum at 1040° C. for 3 hours. The resultant sintered product was cut into a size of 10×10×3 mm.

Next, on a sputtering apparatus (EB1000, by Canon Anelva Corporation), a Ce metal target having a diameter of 2 inches and a thickness of 3 mm was set, and by sputtering at an applied power of 300 W and an Ar pressure of 0.5 Pa for 40 minutes, a Ce film was formed on one surface of 10×10 mm of the sintered product. The sample was processed for diffusion heat treatment in vacuum at 800° C. for 15 hours, then cooled down to 500° C. or lower at a cooling speed of 5.3° C./min, and further processed for aging heat treatment in an Ar gas atmosphere at 550° C. for 1 hour to prepare a sintered product sample of Example 7.

In Example 8, an alloy strip was prepared by strip casting, having a controlled composition of Nd 14.1 at %, B 6.0 at %, Al 0.5 at %, Cu 0.1 at %, and a balance of Fe. The average grain boundary phase distance calculated on the cross section image of the alloy was 4.8 μm. The alloy was processed for hydrogen absorption treatment and dehydrogenation by heating at 400° C. in vacuum to prepare a coarse powder, and then ground with a jet mill in a nitrogen stream to give a fine powder having an average grain size of 3.3 μm. This was compression-molded in a magnetic field to give a powder-compression molded article, which was then sintered in vacuum at 1030° C. for 2 hours. The resultant sintered product was cut into a size of 10×10×3 mm.

Next, a Ce oxide powder and pure water were mixed in a weight ratio of 3/2 and stirred to prepare a liquid, and the above-mentioned sintered product was immersed in the liquid, drawn out, and dried with a fan dryer to apply the powder onto the surface of the sintered product. The sample was processed for diffusion heat treatment at 880° C. in vacuum for 20 hours, then cooled down to 450° C. or lower at a cooling speed of 4.2° C./min, and further subjected to aging heat treatment in an Ar gas atmosphere at 510° C. for 2 hours to prepare a sintered product sample of Example 8.

In Example 9, an alloy strip was prepared by strip casting, having a controlled composition of Nd 14.5 at %, Co 1.0 at %, B 6.2 at %, Al 0.2 at %, Cu 0.1 at %, Zr 0.05 at %, and a balance of Fe, and an alloy was prepared by arc melting, having a controlled composition of Ce 30 at %, Co 35 at %, and a balance of Fe. In the same manner as in Example 1, these were ground into coarse powders and mixed in a weight ratio of 95/5, then ground with a jet mill in a nitrogen stream to give a fine powder having an average grain size of 3.7 μm. This was compression-molded in a magnetic field to give a powder-compression molded article, which was then sintered in vacuum at 1020° C. for 3 hours. The resultant sintered product was cut into a size of 10×10×3 mm.

Next, a Tb oxide powder and pure water were mixed in a weight ratio of 1/1 and stirred to prepare a liquid, and the above-mentioned sintered product was immersed in the liquid, drawn out, and dried with a fan dryer to apply the powder onto the surface of the sintered product. The sample was processed for diffusion heat treatment at 830° C. in vacuum for 20 hours, then cooled down to 500° C. or lower at a cooling speed of 5° C./min, and further subjected to aging heat treatment in an Ar gas atmosphere at 530° C. for 1.5 hours to prepare a sintered product sample of Example 9.

The results of Examples 7 to 9 are shown in Tables 1, 2 and 4. In the structures of all these sintered products, there existed many main phase grains not containing Ce in the center part and containing Ce in the grain outer shell part, and in the grain boundary part, an R'-rich phase and an R'(Fe,Co)$_2$ phase existed each in an amount of 1 vol % or more. The magnetic characteristics of the all were: room temperature $H_{cJ}$ 10 kOe or more, and $H_{cJ}$ temperature coefficient β $(0.01 \times H_{cJ(room\ temperature)} - 0.720)$%/K or more, and the all had good magnetic characteristics.

Example 10, Comparative Example 4

An alloy strip was produced by strip casting, having a composition of Nd 13.5 at %, B 6.0 at %, Al 0.5 at %, Cu 0.2 at % and a balance of Fe, having a thickness of approximately 0.2 to 0.4 mm, and having an average grain boundary phase distance of 4.1 μm, and this was processed for hydrogen absorption and dehydrogenation to give a coarse powder (example 10A powder). Next, using an arc melting furnace, an alloy was produced, having a controlled composition of Ce 35 at %, Co 10 at % and a balance of Fe, this was heat-treated at 850° C. for 15 hours, and then mechanically ground into a coarse powder (example 10B powder). The example 10A powder and the example 10B powder were mixed in a weight ratio of 92/8, and then ground with a jet mill in a nitrogen stream to give a fine powder having an average grain size of 3.6 μm. This was compression-molded in a magnetic field to give a powder-compression molded article, which was then sintered in vacuum at 1000° C. for 2 hours, then cooled down to room temperature, once taken out, and further heat-treated at 500° C. for 3 hours to give a sintered product sample of Example 10.

On the other hand, a sample prepared in the same manner as in Example 10 up to the sintering step was heat-treated at 980° C. for 1 hour, and then cooled in an Ar atmosphere, to be a sample of Comparative Example 4.

By ICP analysis, the compositions of the sintered products of Example 10 and Comparative Example 4 was $Nd_{12.5}Ce_{2.1}Fe_{bal.}Co_{0.7}B_{5.8}Al_{0.4}Cu_{0.1}$. As a result of EPMA structure observation, in both the two, many main phase grains not containing Ce in the center part and containing Ce in the grain outer shell part existed, and, in Example 10, in the grain boundary part, an R'-rich phase and an R'(Fe,Co)$_2$ phase existed each in an amount of 1 vol % or more. An alloy having the same composition, as prepared by arc melting on the basis of the analysis values of the R'(Fe,Co)$_2$ phase, had $T_c$ of 70° C. On the other hand, in Comparative Example 4, an R'-rich phase existed in the grain boundary part, but an R'(Fe,Co)$_2$ phase could not be confirmed. The average crystal grain size of the main phase was 4.9 μm in both Example 10 and Comparative Example 4. The results are shown in Tables 1, 2 and 4. In Example 10, the room temperature $H_{cJ}$ was higher than in Comparative Example 4, and the temperature characteristics of $H_{cJ}$ were better than those in the latter.

Example 11

An alloy strip was produced by strip casting, having a composition of Nd 13.5 at %, B 5.9 at %, Co 1.0 at %, Al 0.5 at %, Cu 0.2 at %, Zr 0.1 at %, and a balance of Fe, having a thickness of approximately 0.2 to 0.4 mm, and having an average grain boundary phase distance of 4.2 μm, and this was processed for hydrogen absorption and dehydrogenation to give a coarse powder (example 11A powder). Next, using an arc melting furnace, an alloy ingot was produced, having a controlled composition of Ce 33.3 at %, Co 1.0 at % and a balance of Fe, this was heat-treated at 860° C. for 18 hours, and then mechanically ground into a coarse powder (example 11B powder). The example 11A powder and the example 11B powder were mixed in a weight ratio of 93/7, and then ground with a jet mill in a nitrogen stream to give a fine powder having an average grain size of 2.9 μm. This was compression-molded in a magnetic field to give a powder-compression molded article, which was then sintered in vacuum at 1020° C. for 3 hours, then cooled down to room temperature, and once taken out. Next, this was processed for intermediate heat treatment in an Ar atmosphere at 900° C. for 1 hour, then cooled down to 450° C. or lower at a cooling speed of 5° C./min, and subsequently subjected to low-temperature heat treatment at 510° C. for 3 hours to give a sintered product sample of Example 11.

By ICP analysis, the composition of the sintered product was $Nd_{12.7}Ce_{1.8}Fe_{bal.}Co_{1.1}B_{5.6}Al_{0.5}Cu_{0.1}Zr_{0.1}$. As a result of EPMA structure observation, in this, many main phase grains not containing Ce in the center part and containing Ce in the grain outer shell part existed. In the grain boundary part, an R'-rich phase and an R'(Fe,Co)$_2$ phase existed each in an amount of 1 vol % or more. An alloy having the same composition, as prepared by arc melting on the basis of the analysis values of the R'(Fe,Co)$_2$ phase, had $T_c$ of 68° C. The average crystal grain size of the main phase was 3.9 μm. The results are shown in Tables 1, 2 and 5.

Figure 4:
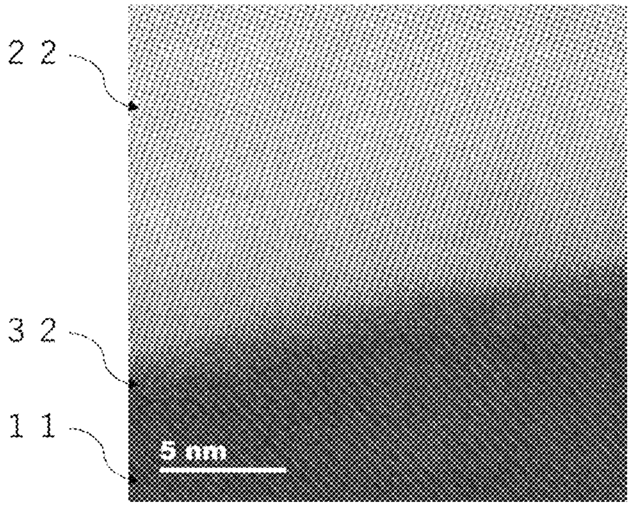
FIG. 4 is an HAADF image showing a boundary phase formed between the main phase and the $R'(Fe,Co)_2$ phase in Example 11.

Using an FIB-SEM apparatus (Scios by FEI Corporation), specimens for observation were cut out of the sample of example 11, and observed with a STEM apparatus (JEM-ARM200F, by JEOL Corporation). As in the HAADF image shown in FIG. 4, it was confirmed that a boundary phase was formed between the R'(Fe,Co)$_2$ phase in the grain boundary part and the main phase. The thickness of the boundary phase was 1.4 nm on average, and the composition of the boundary phase measured in EDS analysis was $Nd_{22.5}Ce_{13.5}Fe_{bal.}Co_{3.0}Cu_{1.7}$. On the other hand, the composition by EDS analysis of the adjacent R'(Fe,Co)$_2$ phase was $Nd_{14.7}Ce_{19.5}Fe_{bal.}Co_{2.3}Cu_{0.1}$. From these, it is known that the boundary phase is a phase having a composition different from that of the R'(Fe,Co)$_2$ phase. In other sites of the same sample, there existed a two-interparticle grain boundary phase having an average thickness of about 2.4 nm between the adjacent main phase grains, and the average composition thereof by EDS analysis was $Nd_{26.8}Ce_{6.9}Fe_{bal.}Co_{7.4}Cu_{12.5}Zr_{0.5}$. From these, the Ce/R' was calculated in each of the boundary phase formed between the main phase and the R'(Fe,Co)$_2$ phase and the two-interparticle grain boundary phase between the main phase grains, and was 0.37 and 0.20, respectively, from which it is known that the Ce/R' is higher in the former.

Example 12

An alloy strip was prepared by strip casting, having a composition of Nd 10.6 at %, Pr 2.5 at %, B 5.9 at %, and a balance of Fe, having a thickness of approximately 0.2 to 0.4 mm, and having an average grain boundary phase distance of 4.0 μm, then processed for hydrogen absorption and dehydrogenation, and then ground with a jet mill in a nitrogen stream to give a fine powder having an average grain size of 3.0 μm. This was compression-molded in a magnetic field to give a powder-compression molded article, which was then sintered in vacuum at 1040° C. for 2 hours. The resultant sintered product was cut into a size of 10×10×3 mm.

Next, using a target having a composition of $Ce_{30}Fe_{bal.}Co_{20}Al_{20}Cu_5V_5$, and having a diameter of 2 inches and a thickness of 3 mm, and by sputtering it at an applied power of 250 W and an Ar pressure of 0.4 Pa for 90 minutes, a Ce film was formed on one surface of 10×10 mm of the sintered product. The sample was processed for diffusion heat treatment in vacuum at 840° C. for 25 hours, then cooled down to 500° C. or lower at a cooling speed of 4.5° C./min, and further processed for aging heat treatment in an Ar gas atmosphere at 540° C. for 3 hours to prepare a sintered product sample of Example 12.

By ICP analysis, the composition of the sintered product of Example 12 was $Nd_{10.2}Pr_{2.4}Ce_{1.0}Fe_{bal.}Co_{0.6}B_{5.6}Al_{0.2}Cu_{0.1}V_{0.1}$. As a result of EPMA structure observation, in this, many main phase grains not containing Ce in the center part and containing Ce in the grain outer shell part existed. In the grain boundary part, an R'-rich phase and an R'(Fe,Co)$_2$ phase existed each in an amount of 1 vol % or more. An alloy having the same composition, as prepared by arc melting on the basis of the analysis values of the R'(Fe,Co)$_2$ phase, had $T_c$ of 78° C. The results are shown in Tables 1, 2 and 5.

STEM observation of the structure of the sample of Example 12 confirmed that a boundary phase having a composition of $Nd_{20.1}Pr_{2.6}Ce_{13.7}Fe_{bal.}Co_{2.5}Cu_{1.9}$ and having an average thickness of 1.6 nm was formed between the R'(Fe,Co)$_2$ phase and the main phase. From this, Ce/R' in the boundary phase is calculated to be 0.38. On the other hand, in other sites of the same sample, a two-interparticle grain boundary phase having an average thickness of approximately 1.8 nm existed between the adjacent main phase grains, and an average composition thereof was $Nd_{17.7}Pr_{6.2}Ce_{6.9}Fe_{bal.}Co_{7.3}Cu_{8.9}V_{0.4}$. (Ce/R'=0.22). From these, it is known that Ce/R' in the boundary phase formed between the main phase and the R'(Fe,Co)$_2$ phase is higher than Ce/R' in the two-interparticle grain boundary phase.

TABLE 1

| | ICP Composition Analysis Values of Sintered Product (at %) | Ce/R' | Average Crystal Grain Diameter (μm) | Crystal Structure of Main Phase |
|---|---|---|---|---|
| Example 1 | $Nd_{9.9}\ Pr_{2.5}\ Ce_{1.8}\ Fe_{bal.}\ Co_{1.0}\ B_{5.6}\ Al_{0.5}\ Cu_{0.1}$ | 0.13 | 4.3 | $Nd_2Fe_{14}B$ |
| Comparative Example 1 | $Nd_{10.0}\ Pr_{2.6}\ Ce_{1.8}\ Fe_{bal.}\ Co_{1.0}\ B_{5.6}\ Al_{0.4}\ Cu_{0.1}$ | 0.13 | 4.0 | $Nd_2Fe_{14}B$ |
| Example 2 | $Nd_{12.4}\ Ce_{1.7}\ Fe_{bal.}\ Co_{1.0}\ B_{5.7}\ Al_{0.1}\ Cu_{0.2}\ Zr_{0.1}$ | 0.12 | 3.8 | $Nd_2Fe_{14}B$ |
| Comparative Example 2 | $Nd_{9.2}\ Ce_{4.9}\ Fe_{bal.}\ Co_{0.9}\ B_{5.8}\ Al_{0.1}\ Cu_{0.2}\ Zr_{0.1}$ | 0.35 | 3.6 | $Nd_2Fe_{14}B$ |
| Example 3 | $Nd_{12.7}\ La_{0.2}\ Ce_{2.2}\ Fe_{bal.}\ B_{6.0}\ Al_{0.3}\ Ni_{0.1}$ | 0.15 | 4.6 | $Nd_2Fe_{14}B$ |
| Example 4 | $Nd_{11.7}\ Gd_{0.5}\ Ce_{2.1}\ Fe_{bal.}\ Co_{2.3}\ B_{5.6}\ Al_{0.4}\ Cr_{0.2}\ Ti_{0.1}$ | 0.15 | 3.8 | $Nd_2Fe_{14}B$ |
| Example 5 | $Nd_{12.5}\ Y_{0.3}\ Ce_{1.8}\ Fe_{bal.}\ Co_{0.5}\ B_{5.8}\ Ga_{0.3}\ Si_{0.3}$ | 0.12 | 3.4 | $Nd_2Fe_{14}B$ |
| Example 6 | $Nd_{13.6}\ Dy_{0.1}\ Ce_{0.6}\ Fe_{bal.}\ Co_{1.2}\ B_{5.8}\ Al_{0.2}\ Cu_{0.1}$ | 0.04 | 4.6 | $Nd_2Fe_{14}B$ |
| Comparative Example 3 | $Nd_{14.0}\ Fe_{bal.}\ Co_{0.4}\ B_{6.0}\ Al_{0.1}$ | 0.00 | 4.6 | $Nd_2Fe_{14}B$ |
| Example 7 | $Nd_{11.9}\ Pr_{2.8}\ Ce_{0.4}\ Fe_{bal.}\ Co_{0.9}\ B_{4.0}\ Al_{0.2}\ Si_{0.2}\ Nb_{0.5}$ | 0.05 | 4.0 | $Nd_2Fe_{14}B$ |
| Example 8 | $Nd_{13.1}\ Ce_{0.7}\ Fe_{bal.}\ B_{6.0}\ Al_{0.5}\ Cu_{0.1}$ | 0.05 | 4.3 | $Nd_2Fe_{14}B$ |
| Example 9 | $Nd_{13.7}\ Tb_{0.3}\ Ce_{1.2}\ Fe_{bal.}\ Co_{2.4}\ B_{5.9}\ Al_{0.2}\ Cu_{0.1}\ Zr_{0.1}$ | 0.08 | 4.8 | $Nd_2Fe_{14}B$ |
| Example 10 | $Nd_{12.5}\ Ce_{2.1}\ Fe_{bal.}\ Co_{0.7}\ B_{5.8}\ Al_{0.4}\ Cu_{0.1}$ | 0.14 | 4.9 | $Nd_2Fe_{14}B$ |
| Comparative Example 4 | | | | |
| Example 11 | $Nd_{12.6}\ Ce_{1.8}\ Fe_{bal.}\ Co_{1.0}\ B_{5.7}\ Al_{0.4}\ Cu_{0.2}\ Zr_{0.1}$ | 0.13 | 3.9 | $Nd_2Fe_{14}B$ |
| Example 12 | $Nd_{10.2}\ Pr_{2.4}\ Ce_{1.0}\ Fe_{bal.}\ Co_{0.6}\ B_{5.6}\ Al_{0.2}\ Cu_{0.1}\ V_{0.1}$ | 0.07 | 3.8 | $Nd_2Fe_{14}B$ |

TABLE 2

| | Sintering Heat Treatment | Diffusion Heat Treatment | Cooling Speed after Diffusion Heat Treatment | Intermediate Heat Treatment | Cooling Speed after Intermediate Heat Treatment | Aging Heat Treatment | $B_r$($_{room\ temperature}$) (kG) | $H_{cJ}$($_{room\ temperature}$) (kOe) | β (%/K) | $β_0$*1 (%/K) |
|---|---|---|---|---|---|---|---|---|---|---|
| Example 1 | 1040° C. 3 h | — | — | — | — | 510° C. 2 h | 14.0 | 13.6 | −0.575 | −0.584 |
| Comparative Example 1 | 1040° C. 3 h | — | — | — | — | 510° C. 2 h | 13.7 | 9.8 | −0.641 | −0.622 |
| Example 2 | 1020° C. 2 h | — | — | — | — | 530° C. 4 h | 14.2 | 12.3 | −0.564 | −0.597 |
| Comparative Example 2 | 1020° C. 2 h | — | — | — | — | 530° C. 4 h | 12.7 | 8.8 | −0.635 | −0.632 |
| Example 3 | 1010° C. 3 h | — | — | — | — | 480° C. 1 h | 13.4 | 10.3 | −0.601 | −0.617 |
| Example 4 | 1030° C. 1.5 h | — | — | 900° C. 1 h | 3.8° C./min | 600° C. 3 h | 13.5 | 15.7 | −0.514 | −0.563 |
| Example 5 | 1060° C. 2 h | — | — | 960° C. 2 h | 4.5° C./min | 680° C. 3 h | 13.8 | 14.9 | −0.543 | −0.571 |
| Example 6 | 1040° C. 3 h | 870° C. 10 h | 5.0° C./min | — | — | 560° C. 2 h | 14.3 | 14.1 | −0.572 | −0.579 |
| Comparative Example 3 | | — | — | — | — | 560° C. 2 h | 14.5 | 11.6 | −0.616 | −0.604 |
| Example 7 | 1040° C. 3 h | 800° C. 15 h | 5.3° C./min | — | — | 550° C. 1 h | 14.0 | 13.2 | −0.583 | −0.588 |
| Example 8 | 1030° C. 2 h | 880° C. 20 h | 4.2° C./min | — | — | 510° C. 2 h | 14.4 | 12.1 | −0.585 | −0.599 |
| Example 9 | 1020° C. 3 h | 830° C. 20 h | 5.0° C./min | — | — | 530° C. 1.5 h | 13.6 | 20.7 | −0.497 | −0.513 |
| Example 10 | 1000° C. 2 h | — | — | — | — | 500° C. 3 h | 13.8 | 13.8 | −0.570 | −0.582 |
| Comparative Example 4 | | | | | | 980° C. 1 h | 13.9 | 10.1 | −0.651 | −0.619 |
| Example 11 | 1020° C. 3 h | — | — | 900° C. 1 h | 5.0° C./min | 510° C. 3 h | 13.9 | 14.9 | −0.557 | −0.571 |
| Example 12 | 1040° C. 2 h | 840° C. 25 h | 4.5° C./min | — | — | 540° C. 3 h | 14.5 | 11.0 | −0.603 | −0.610 |

*1 $β_0 = 0.01 \times H_{cJ}(_{room\ temperature}) - 0.720$ (%/K)

TABLE 3

| | Constituent Phase | | EPMA Composition Analysis Data of Each Phase (at %) | Ce/R' | Phase Ratio (vol %) | |
|---|---|---|---|---|---|---|
| Example 1 | Main Phase Grains | Grain Center Part | $Nd_{9.4}Pr_{2.4}Fe_{bal.}Co_{0.9}B_{5.9}Al_{0.5}$ | 0.00 | 92.1 | |
| | | Grain Outer Shell Part | $Nd_{7.6}Pr_{1.6}Ce_{2.6}Fe_{bal.}Co_{1.0}B_{5.9}Al_{0.5}$ | 0.22 | | |
| | Grain Boundary Part | R'(FeCo)$_2$ Phase | $Nd_{10.7}Pr_{3.3}Ce_{19.9}Fe_{bal.}Co_{2.1}Al_{0.5}$ | 0.59 | 1.8 | 4.4 |
| | | R'-rich Phase | $Nd_{54.9}Pr_{22.4}Ce_{13.3}Fe_{bal.}Co_{4.2}Al_{0.5}Cu_{4.0}$ | 0.15 | 2.6 | |
| Comparative Example 1 | Main Phase Grains | Main Phase | $Nd_{8.4}Pr_{1.9}Ce_{1.4}Fe_{bal.}Co_{1.0}B_{5.9}Al_{0.5}$ | 0.12 | 92.3 | |
| | Grain Boundary Part | R'-rich Phase | $Nd_{48.4}Pr_{23.3}Ce_{10.3}Fe_{bal.}Co_{5.2}Al_{0.5}Cu_{5.5}$ | 0.13 | 4.2 | |
| Example 2 | Main Phase Grains | Grain Center Part | $Nd_{11.6}Fe_{bal.}Co_{0.9}B_{5.9}Al_{0.1}$ | 0.00 | 91.7 | |
| | | Grain Outer Shell Part | $Nd_{9.3}Ce_{2.5}Fe_{bal.}Co_{0.9}B_{5.9}Al_{0.1}$ | 0.21 | | |
| | Grain Boundary Part | R'(FeCo)$_2$ Phase | $Nd_{13.5}Ce_{18.9}Fe_{bal.}Co_{1.4}Al_{0.1}$ | 0.58 | 1.6 | 4.6 |
| | | R'-rich Phase | $Nd_{64.1}Ce_{11.0}Fe_{bal.}Co_{11.4}Al_{0.1}Cu_{10.1}$ | 0.15 | 3.0 | |
| | | Zr-rich Phase | $Fe_{bal.}B_{69.3}Zr_{28.2}$ | — | 0.3 | |

TABLE 3-continued

| | Constituent Phase | | EPMA Composition Analysis Data of Each Phase (at %) | Ce/R' | Phase Ratio (vol %) |
|---|---|---|---|---|---|
| Comparative Example 2 | Main Phase Grains | Grain Center Part | $Nd_{7.0}Ce_{4.6}Fe_{bal.}Co_{0.9}B_{5.8}Al_{0.1}$ | 0.40 | 88.3 |
| | | Grain Outer Shell Part | $Nd_{9.7}Ce_{2.0}Fe_{bal.}Co_{0.9}B_{5.8}Al_{0.1}$ | 0.17 | |
| | Grain Boundary Part | R'(FeCo)$_2$ Phase | $Nd_{15.1}Ce_{17.6}Fe_{bal.}Co_{1.5}Al_{0.1}$ | 0.54 | 7.0 7.7 |
| | | R'Cu$_2$ Phase | $Nd_{25.2}Ce_{6.4}Cu_{68.4}$ | 0.20 | 0.7 |
| | | B-rich Phase | $Nd_{10.9}Ce_{1.0}Fe_{bal.}Co_{0.9}B_{42.3}Al_{0.1}$ | 0.08 | 0.6 |
| | | Zr-rich Phase | $Fe_{bal.}B_{70.7}Zr_{25.2}$ | — | 0.4 |
| Example 3 | Main Phase Grains | Grain Center Part | $Nd_{11.6}Fe_{bal.}B_{5.9}Al_{0.3}Ni_{0.1}$ | 0.00 | 87.6 |
| | | Grain Outer Shell Part | $Nd_{8.8}La_{0.1}Ce_{3.0}Fe_{bal.}B_{5.9}Al_{0.4}Ni_{0.1}$ | 0.25 | |
| | Grain Boundary Part | R'(FeCo)$_2$ Phase | $Nd_{13.3}La_{0.4}Ce_{20.8}Fe_{bal.}Al_{0.3}Ni_{0.1}$ | 0.60 | 3.2 7.4 |
| | | R'-rich Phase | $Nd_{66.0}La_{6.0}Ce_{16.3}Fe_{bal.}Al_{0.3}Ni_{0.1}$ | 0.18 | 4.2 |
| | | B-rich Phase | $Nd_{8.6}La_{0.2}Ce_{3.4}Fe_{bal.}B_{44.6}Al_{0.3}Ni_{0.1}$ | 0.28 | 1.0 |
| Example 4 | Main Phase Grains | Grain Center Part | $Nd_{11.7}Fe_{bal.}Co_{2.2}B_{5.9}Al_{0.4}Cr_{0.2}$ | 0.00 | 89.3 |
| | | Grain Outer Shell Part | $Nd_{8.0}Gd_{0.9}Ce_{2.8}Fe_{bal.}Co_{2.2}B_{5.9}Al_{0.4}Cr_{0.2}$ | 0.24 | |
| | Grain Boundary Part | R'(FeCo)$_2$ Phase | $Nd_{11.1}Gd_{2.0}Ce_{19.4}Fe_{bal.}Co_{3.4}Al_{0.4}$ | 0.60 | 4.8 6.7 |
| | | R'-rich Phase | $Nd_{50.3}Gd_{1.2}Ce_{13.5}Fe_{bal.}Co_{5.8}Al_{0.5}$ | 0.21 | 1.9 |
| | | Ti-rich Phase | $Fe_{bal.}B_{67.1}Ti_{32.5}$ | — | 0.2 |
| Example 5 | Main Phase Grains | Grain Center Part | $Nd_{11.9}Fe_{bal.}Co_{0.5}B_{6.0}Si_{0.2}$ | 0.00 | 88.6 |
| | | Grain Outer Shell Part | $Nd_{9.1}Y_{0.3}Ce_{2.5}Fe_{bal.}Co_{0.5}B_{6.0}Si_{0.2}$ | 0.21 | |
| | Grain Boundary Part | R'(FeCo)$_2$ Phase | $Nd_{13.0}Y_{0.1}Ce_{18.3}Fe_{bal.}Co_{0.5}$ | 0.58 | 5.6 7.8 |
| | | R'-rich Phase | $Nd_{55.9}Y_{0.2}Ce_{8.6}Fe_{bal.}Ga_{23.1}Si_{11.9}$ | 0.13 | 2.2 |
| | | B-rich Phase | $Nd_{10.2}Y_{0.2}Ce_{1.4}Fe_{bal.}Co_{0.5}B_{42.1}$ | 0.12 | 0.7 |

TABLE 4

| | Constituent Phase | | EPMA Composition Analysis Data of Each Phase (at %) | Ce/R' | Phase Ratio (vol %) |
|---|---|---|---|---|---|
| Example 6 | Main Phase Grains | Grain Center Part | $Nd_{11.8}Fe_{bal.}Co_{1.1}B_{5.8}Al_{0.2}$ | 0.00 | 90.7 |
| | | Grain Outer Shell Part | $Nd_{10.2}Dy_{0.3}Ce_{1.1}Fe_{bal.}Co_{1.0}B_{5.8}Al_{0.1}$ | 0.09 | |
| | Grain Boundary Part | R'(FeCo)$_2$ Phase | $Nd_{19.3}Dy_{0.8}Ce_{12.8}Fe_{bal.}Co_{1.9}Al_{0.2}$ | 0.39 | 1.3 5.4 |
| | | R'-rich Phase | $Nd_{58.5}Dy_{3.1}Ce_{6.9}Fe_{bal.}Co_{6.9}Al_{0.2}Cu_{5.5}$ | 0.10 | 4.1 |
| | | B-rich Phase | $Nd_{11.2}Dy_{0.4}Ce_{0.4}Fe_{bal.}Co_{1.0}B_{42.7}Al_{0.2}$ | 0.03 | 0.7 |
| Comparative Example 3 | Main Phase Grains | Main Phase | $Nd_{11.69}Fe_{bal.}Co_{0.4}B_{5.9}Al_{0.1}$ | 0.00 | 92.1 |
| | Grain Boundary Part | R'-rich Phase | $Nd_{80.6}Fe_{bal.}Al_{0.2}$ | 0.00 | 4.0 |
| | | B-rich Phase | $Nd_{11.9}Fe_{bal.}Co_{0.4}B_{42.2}Al_{0.1}$ | 0.00 | 0.7 |
| Example 7 | Main Phase Grains | Grain Center Part | $Nd_{9.7}Pr_{2.1}Fe_{bal.}Co_{1.0}B_{6.0}Al_{0.3}Si_{0.2}$ | 0.00 | 89.2 |
| | | Grain Outer Shell Part | $Nd_{9.1}Pr_{1.7}Ce_{1.1}Fe_{bal.}Co_{1.0}B_{6.0}Al_{0.3}Si_{0.2}$ | 0.09 | |
| | Grain Boundary Part | R'(FeCo)$_2$ Phase | $Nd_{16.4}Pr_{4.5}Ce_{13.0}Fe_{bal.}Co_{2.2}Al_{0.3}$ | 0.38 | 2.1 5.8 |
| | | R'-rich Phase | $Nd_{47.8}Pr_{20.5}Ce_{11.3}Fe_{bal.}Al_{0.3}Si_{7.6}$ | 0.33 | 3.7 |
| | | Nb-rich Phase | $Fe_{bal.}B_{41.9}Nb_{27.9}$ | — | 0.5 |
| Example 8 | Main Phase Grains | Grain Center Part | $Nd_{11.8}Fe_{bal.}B_{6.0}Al_{0.5}$ | 0.00 | 92.2 |
| | | Grain Outer Shell Part | $Nd_{10.2}Ce_{1.7}Fe_{bal.}Co_{0.0}B_{6.0}Al_{0.5}$ | 0.14 | |
| | Grain Boundary Part | R'(FeCo)$_2$ Phase | $Nd_{17.0}Ce_{16.9}Fe_{bal.}Al_{0.5}$ | 0.50 | 2.7 3.7 |
| | | R'-rich Phase | $Nd_{68.0}Ce_{12.2}Fe_{bal.}Co_{4.8}Al_{0.5}Cu_{12.5}$ | 0.15 | 1.0 |
| | | B-rich Phase | $Nd_{11.2}Ce_{0.8}Fe_{bal.}Co_{0.0}B_{42.4}Al_{0.4}$ | 0.07 | 0.6 |
| Example 9 | Main Phase Grains | Grain Center Part | $Nd_{11.8}Fe_{bal.}Co_{2.3}B_{5.9}Al_{0.2}$ | 0.00 | 87.0 |
| | | Grain Outer Shell Part | $Nd_{9.1}Tb_{1.0}Ce_{1.8}Fe_{bal.}Co_{2.4}B_{5.9}Al_{0.2}$ | 0.15 | |
| | Grain Boundary Part | R'(FeCo)$_2$ Phase | $Nd_{15.4}Tb_{1.1}Ce_{17.1}Fe_{bal.}Co_{5.0}Al_{0.2}$ | 0.51 | 4.9 8.7 |
| | | R'-rich Phase | $Nd_{77.8}Tb_{1.3}Ce_{4.1}Fe_{bal.}Co_{2.5}Al_{0.1}Cu_{3.0}$ | 0.05 | 3.8 |
| | | B-rich Phase | $Nd_{9.2}Tb_{1.1}Ce_{1.8}Fe_{bal.}Co_{2.4}B_{43.9}Al_{0.2}$ | 0.15 | 0.7 |
| | | Zr-rich Phase | $Fe_{bal.}B_{69.7}Zr_{27.3}$ | — | 0.1 |
| Example 10 | Main Phase Grains | Grain Center Part | $Nd_{11.9}Fe_{bal.}Co_{0.5}B_{5.9}Al_{0.4}$ | 0.00 | 90.8 |
| | | Grain Outer Shell Part | $Nd_{9.0}Ce_{2.8}Fe_{bal.}Co_{0.5}B_{5.9}Al_{0.4}$ | 0.24 | |
| | Grain Boundary Part | R'(FeCo)$_2$ Phase | $Nd_{13.7}Ce_{20.2}Fe_{bal.}Co_{1.2}Al_{0.4}$ | 0.60 | 3.0 5.6 |
| | | R'-rich Phase | $Nd_{62.7}Ce_{15.0}Fe_{bal.}Co_{8.4}Al_{0.4}Cu_{12.5}$ | 0.19 | 2.6 |
| | | B-rich Phase | $Nd_{8.2}Ce_{4.1}Fe_{bal.}Co_{0.5}B_{45.9}Al_{0.4}$ | 0.33 | 0.2 |
| Comparative Example 4 | Main Phase Grains | Grain Center Part | $Nd_{11.8}Fe_{bal.}Co_{0.6}B_{5.9}Al_{0.4}$ | 0.00 | 91.7 |
| | | Grain Outer Shell Part | $Nd_{9.0}Ce_{2.8}Fe_{bal.}Co_{0.6}B_{5.9}Al_{0.4}$ | 0.24 | |
| | Grain Boundary Part | R'-rich Phase | $Nd_{72.5}Ce_{15.7}Fe_{bal.}Co_{4.5}Al_{0.4}Cu_{6.5}$ | 0.18 | 4.8 |

TABLE 5

| | Constituent Phase | | EPMA Composition Analysis Data of Each Phase (at %) | Ce/R' | Phase Ratio (vol %) |
|---|---|---|---|---|---|
| Example 11 | Main Phase Grains | Grain Center Part | $Nd_{11.8}Fe_{bal.}Co_{1.0}B_{5.8}Al_{0.4}$ | 0.00 | 90.5 |
| | | Grain Outer Shell Part | $Nd_{9.2}Ce_{2.5}Fe_{bal.}Co_{0.9}B_{5.8}Al_{0.4}$ | 0.21 | |

TABLE 5-continued

| | Constituent Phase | | EPMA Composition Analysis Data of Each Phase (at %) | Ce/R' | Phase Ratio (vol %) | |
|---|---|---|---|---|---|---|
| | Grain Boundary Part | R'(FeCo)$_2$ Phase | $Nd_{14.2}Ce_{19.9}Fe_{bal.}Co_{2.3}Al_{0.5}$ | 0.58 | 2.8 | 6.1 |
| | | R'-rich Phase | $Nd_{64.9}Ce_{14.8}Fe_{bal.}Co_{6.7}Al_{0.5}Cu_{11.5}$ | 0.19 | 3.0 | |
| | | B-rich Phase | $Nd_{8.8}Ce_{3.4}Fe_{bal.}Co_{0.9}B_{45.3}Al_{0.5}$ | 0.28 | 0.2 | |
| | | Zr-rich Phase | $Fe_{bal.}B_{60.0}Zr_{35.3}$ | — | 0.1 | |
| Example 12 | Main Phase Grains | Grain Center Part | $Nd_{9.4}Pr_{2.2}Fe_{bal.}Co_{0.6}B_{5.8}Al_{0.3}$ | 0.00 | 93.3 | |
| | | Grain Outer Shell Part | $Nd_{7.9}Pr_{1.6}Ce_{2.2}Fe_{bal.}Co_{0.6}B_{5.8}Al_{0.2}V_{0.1}$ | 0.19 | | |
| | Grain Boundary Part | R'(FeCo)$_2$ Phase | $Nd_{12.3}Pr_{3.2}Ce_{19.7}Fe_{bal.}Co_{1.7}Al_{0.3}$ | 0.56 | 1.0 | 3.2 |
| | | R'-rich Phase | $Nd_{52.2}Pr_{18.8}Ce_{12.4}Fe_{bal.}Co_{6.5}Al_{0.3}Cu_{8.2}V_{0.2}$ | 0.15 | 2.1 | |
| | | V-rich Phase | $Fe_{bal.}B_{35.1}V_{42.2}$ | — | 0.1 | |

REFERENCE SIGNS LIST

11 Main phase (region having high Ce/R')
12 Main phase (region having low Ce/R')
21 R'-rich phase
22 R'(Fe,Co)$_2$ phase
31 Two-interparticle grain boundary phase formed between adjacent main phase grains
32 Boundary phase formed between R'(Fe,Co)2 phase and main phase

The invention claimed is:

1. An anisotropic rare earth sintered magnet having a composition of a formula $R_x(Fe_{1-a}Co_a)_{100-x-y-z}B_yM_z$, in which the main phase is formed of an $R_2Fe_{14}B$ compound crystal, the main phase grains existing therein are such that the Ce/R' ratio in the center part of the grains is lower than the Ce/R' ratio in the outer shell part thereof, and a Ce-containing R'-rich phase and a Ce-containing R'(Fe,Co)$_2$ phase exist in the grain boundary part, wherein a boundary phase containing 20 at % or more R and having a thickness of 0.1 nm or more and 20 nm or less is formed between the main phase and the R'(Fe,Co)$_2$ phase, R is two or more kinds of elements selected from rare earth elements and indispensably including Nd and Ce, M is one or more kinds of elements selected from the group consisting of Al, Si, Ti, V, Cr, Mn, Ni, Cu, Zn, Ga, Ge, Zr, Nb, Mo, Ag, In, Sn, Hf, Ta, W, Pb, and Bi, and x, y, z, and a each satisfy $12 \le x \le 17$ at %, $3.5 \le y \le 6.0$ at %, $0 \le z \le 3$ at %, and $0 \le a \le 0.1$, R' is one or more kinds of elements selected from rare earth elements and indispensably including Nd, a content of Ce in the R' rich phase is 4.1 at % or more and 16.3 at % or less, and a content of CE in the R'(Fe, Co), phase is 12.8 at % or more and 20.8 at % or less.

2. The anisotropic rare earth sintered magnet according to claim 1, wherein a B-rich phase further exists in the grain boundary part.

3. The anisotropic rare earth sintered magnet according to claim 1, wherein in the main phase grains, main phase grains not containing Ce in R' in the center part exist.

4. The anisotropic rare earth sintered magnet according to claim 1, wherein in the main phase grains, main phase grains where R' in the center part is Nd, or Nd and Pr exist.

5. The anisotropic rare earth sintered magnet according to claim 1, wherein the R'(Fe,Co)$_2$ phase is a phase showing ferromagneticity or ferrimagneticity at room temperature or higher.

6. The anisotropic rare earth sintered magnet according to claim 1, wherein the Ce/R' ratio in the R'(Fe,Co)$_2$ phase is higher than the Ce/R' ratio in the outer shell part of the main phase grains.

7. The anisotropic rare earth sintered magnet according to claim 1, wherein the Ce/R' ratio in the R'-rich phase is higher than the Ce/R' ratio in the outer shell part of the main phase grains.

8. The anisotropic rare earth sintered magnet according to claim 1, which contains the R'-rich phase and the R'(Fe,Co)$_2$ phase in a ratio of 1 vol % or more in total.

9. The anisotropic rare earth sintered magnet according to claim 1, wherein the Ce/R' ratio in the composition of the sintered magnet is 0.01 or more and 0.3 or less.

10. The anisotropic rare earth sintered magnet according to claim 1, wherein a ratio of a B-rich phase contained in the sintered magnet is 5 vol % or less.

11. The anisotropic rare earth sintered magnet according to claim 1, wherein a two-interparticle grain boundary phase is formed between the adjacent main phase grains.

12. The anisotropic rare earth sintered magnet according to claim 11, wherein Ce/R' in the boundary phase formed between the main phase and the R'(Fe,Co)$_2$ phase is higher than Ce/R' in the two-interparticle grain boundary phase formed between the adjacent main phase grains.

13. The anisotropic rare earth sintered magnet according to claim 1, of which the coercive force at room temperature $H_{cJ(room\ temperature)}$ is 10 kOe or more, and a value of a temperature coefficient of the coercive force β is $\beta \ge (0.01 \times H_{cJ(room\ temperature)} - 0.720)$ %/K.

14. A method for producing the anisotropic rare earth sintered magnet of claim 1, comprising grinding an alloy that contains an $Nd_2Fe_{14}B$ crystal compound phase and an alloy having a higher R' composition ratio and a higher Ce/R' ratio than the former, followed by mixing and powder-compression molding it in a magnetic field to give a molded product, and then sintering it at a temperature of 800° C. or higher and 1200° C. or lower.

15. The method for producing an anisotropic rare earth sintered magnet according to claim 14, wherein the sintered product is heat-treated at a temperature of 300 to 800° C.

16. The method for producing an anisotropic rare earth sintered magnet according to claim 14, wherein the sintered product is heat-treated at a temperature of 600 to 1000° C., then cooled down to at least 550° C. or lower at a cooling speed of 1° C./min or more and 50° C./min or less, and then further heat-treated at a temperature of 300 to 800° C.

17. A method for producing the anisotropic rare earth sintered magnet of claim 1, comprising grinding an alloy that contains an $Nd_2Fe_{14}B$ crystal compound phase followed by powder-compression molding it in a magnetic field to give a molded product, then sintering it at a temperature of 800° C. or higher and 1200° C. or lower, then bringing the sintered product into contact with a Ce-containing material and heat-treating it at a temperature of 600° C. or higher and a sintering temperature or lower to make Ce diffuse inside the sintered product.

18. The method for producing an anisotropic rare earth sintered magnet according to claim 15, wherein the Ce-containing material to be brought into contact with the sintered product is one or more kinds selected from a Ce metal, a Ce-containing alloy and a Ce-containing compound, and the form thereof is one or more kinds selected from a powder, a thin film, a thin strip, a foil and a vapor.

* * * * *